(12) United States Patent  
Heyer

(10) Patent No.: US 8,775,322 B2  
(45) Date of Patent: *Jul. 8, 2014

(54) SYSTEM FOR MATCHING BUYERS AND SELLERS BASED ON BUYER SELLER PREFERENCES

(75) Inventor: Gary E. Heyer, Chaska, MN (US)

(73) Assignee: Facet Technology Corp., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/404,455

(22) Filed: Feb. 24, 2012

(65) Prior Publication Data

US 2012/0158600 A1 Jun. 21, 2012

Related U.S. Application Data

(63) Continuation of application No. 10/893,458, filed on Jul. 16, 2004, now Pat. No. 8,140,442.

(51) Int. Cl.
*G06Q 50/00* (2012.01)
*G06Q 10/00* (2012.01)
*G06Q 30/00* (2012.01)

(52) U.S. Cl.
USPC ......... 705/313; 705/1.1; 705/26.1; 705/26.61

(58) Field of Classification Search
USPC .............................. 705/313, 1.1, 26.1, 26.61
See application file for complete search history.

(56) References Cited

U.S. PATENT DOCUMENTS

| | | | |
|---|---|---|---|
| 5,592,375 A | 1/1997 | Salmon et al. | |
| 5,623,403 A | 4/1997 | Highbloom | |
| 5,664,115 A | 9/1997 | Fraser | |
| 6,523,037 B1 | 2/2003 | Monahan et al. | |
| 6,732,161 B1 | 5/2004 | Hess et al. | |
| 6,748,422 B2 | 6/2004 | Morin et al. | |
| 6,763,384 B1 | 7/2004 | Gupta et al. | |
| 7,805,376 B2 | 9/2010 | Smith | |
| 7,818,212 B1 | 10/2010 | Mesaros | |
| 2004/0088219 A1* | 5/2004 | Sanders et al. | 705/14 |
| 2005/0075894 A1 | 4/2005 | Bushey et al. | |

OTHER PUBLICATIONS

Information on FSBO.com, 1996-2002, printed through www.archive.org. Date is in the URL in YYYYMMDD format.*
Information on HomeGain.com, 199902003, HomeGain, Inc., printed through www.archive.org. Data is in the URL in YYYYM-MDD format.*
Information on Realtor Workstation, 2000, Metropolital Regional Information Systems, Inc.*
Information on FSBO.com, 1996-2002, printed through www.archive.org.
Information on CraigsList.com, 1998-2002, printed through www.archive.org.
Information on HomeGain, 1999-2003, HonneGain.com, Inc., printed through www.archive.org. date is in the URL in YYYYM-MDD format.
Information on Realtor Workstation, 2000, Metropolitan Regional Information Systems, Inc.

* cited by examiner

*Primary Examiner* — Naresh Vig
(74) *Attorney, Agent, or Firm* — Patterson Thuente Pedersen, P.A.

(57) ABSTRACT

Computerized methods, devices, and systems are provided for facilitating property and service transactions. Characteristics are entered, tracked and updated for potential buyers and potential sellers. Prospective buyers can locate potential sellers based on buyer preferences and seller characteristics. Prospective sellers can locate potential buyers based on seller preferences and buyer characteristics.

30 Claims, 25 Drawing Sheets

FIG. 3

| | |
|---|---|
| FIG. 3A | FIG. 3B |

CURRENT MARKET SERVED BY TRADITIONAL METHOD OF MARKETING PROPERTY AND SERVICES

| | READY | WILLING | ABLE |
|---|---|---|---|
| BUYER | T | T | T |
| SELLER | T | T | T |

| | READY | WILLING | ABLE |
|---|---|---|---|
| BUYER | T | T | T |
| SELLER | T | F | T |

| | READY | WILLING | ABLE |
|---|---|---|---|
| BUYER | T | F | T |
| SELLER | T | F | T |

| | READY | WILLING | ABLE |
|---|---|---|---|
| BUYER | T | F | T |
| SELLER | T | T | T |

| | READY | WILLING | ABLE |
|---|---|---|---|
| BUYER | T | T | T |
| SELLER | T | F | F |

| | READY | WILLING | ABLE |
|---|---|---|---|
| BUYER | T | T | F |
| SELLER | T | F | T |

| | READY | WILLING | ABLE |
|---|---|---|---|
| BUYER | T | T | F |
| SELLER | T | F | F |

| | READY | WILLING | ABLE |
|---|---|---|---|
| BUYER | T | T | F |
| SELLER | T | T | F |

| | READY | WILLING | ABLE |
|---|---|---|---|
| BUYER | T | T | T |
| SELLER | T | T | F |

| | READY | WILLING | ABLE |
|---|---|---|---|
| BUYER | T | T | F |
| SELLER | T | T | T |

| | READY | WILLING | ABLE |
|---|---|---|---|
| BUYER | F | T | T |
| SELLER | T | T | T |

| | READY | WILLING | ABLE |
|---|---|---|---|
| BUYER | F | F | T |
| SELLER | T | T | T |

| | READY | WILLING | ABLE |
|---|---|---|---|
| BUYER | F | T | T |
| SELLER | T | F | T |

| | READY | WILLING | ABLE |
|---|---|---|---|
| BUYER | F | T | T |
| SELLER | T | F | F |

| | READY | WILLING | ABLE |
|---|---|---|---|
| BUYER | F | T | F |
| SELLER | T | F | T |

| | READY | WILLING | ABLE |
|---|---|---|---|
| BUYER | F | T | F |
| SELLER | T | F | F |

| | READY | WILLING | ABLE |
|---|---|---|---|
| BUYER | F | F | T |
| SELLER | T | F | T |

| | READY | WILLING | ABLE |
|---|---|---|---|
| BUYER | F | T | F |
| SELLER | T | T | F |

| | READY | WILLING | ABLE |
|---|---|---|---|
| BUYER | F | T | F |
| SELLER | T | T | T |

*Fig. 3A*

READY, WILLING AND ABLE TRUTH TABLES

|        | READY | WILLING | ABLE |
|--------|-------|---------|------|
| BUYER  | T     | T       | T    |
| SELLER | F     | T       | T    |

|        | READY | WILLING | ABLE |
|--------|-------|---------|------|
| BUYER  | F     | T       | T    |
| SELLER | F     | T       | T    |

|        | READY | WILLING | ABLE |
|--------|-------|---------|------|
| BUYER  | T     | F       | T    |
| SELLER | F     | T       | T    |

|        | READY | WILLING | ABLE |
|--------|-------|---------|------|
| BUYER  | F     | F       | T    |
| SELLER | F     | T       | T    |

|        | READY | WILLING | ABLE |
|--------|-------|---------|------|
| BUYER  | T     | T       | T    |
| SELLER | F     | F       | T    |

|        | READY | WILLING | ABLE |
|--------|-------|---------|------|
| BUYER  | F     | T       | T    |
| SELLER | F     | F       | T    |

|        | READY | WILLING | ABLE |
|--------|-------|---------|------|
| BUYER  | T     | T       | T    |
| SELLER | F     | F       | F    |

|        | READY | WILLING | ABLE |
|--------|-------|---------|------|
| BUYER  | F     | T       | T    |
| SELLER | F     | F       | F    |

|        | READY | WILLING | ABLE |
|--------|-------|---------|------|
| BUYER  | T     | T       | F    |
| SELLER | F     | F       | T    |

|        | READY | WILLING | ABLE |
|--------|-------|---------|------|
| BUYER  | F     | T       | F    |
| SELLER | F     | F       | T    |

|        | READY | WILLING | ABLE |
|--------|-------|---------|------|
| BUYER  | T     | T       | F    |
| SELLER | F     | F       | F    |

|        | READY | WILLING | ABLE |
|--------|-------|---------|------|
| BUYER  | F     | T       | F    |
| SELLER | F     | F       | F    |

|        | READY | WILLING | ABLE |
|--------|-------|---------|------|
| BUYER  | T     | F       | T    |
| SELLER | F     | F       | T    |

|        | READY | WILLING | ABLE |
|--------|-------|---------|------|
| BUYER  | F     | F       | T    |
| SELLER | F     | F       | T    |

|        | READY | WILLING | ABLE |
|--------|-------|---------|------|
| BUYER  | T     | T       | F    |
| SELLER | F     | T       | F    |

|        | READY | WILLING | ABLE |
|--------|-------|---------|------|
| BUYER  | F     | T       | F    |
| SELLER | F     | T       | F    |

|        | READY | WILLING | ABLE |
|--------|-------|---------|------|
| BUYER  | T     | T       | T    |
| SELLER | F     | T       | F    |

|        | READY | WILLING | ABLE |
|--------|-------|---------|------|
| BUYER  | F     | T       | T    |
| SELLER | F     | T       | F    |

|        | READY | WILLING | ABLE |
|--------|-------|---------|------|
| BUYER  | T     | T       | F    |
| SELLER | F     | T       | T    |

|        | READY | WILLING | ABLE |
|--------|-------|---------|------|
| BUYER  | F     | T       | F    |
| SELLER | F     | T       | T    |

*Fig. 3B*

| BUYERS (TAB) | (SELLERS) 1308 | 1314 WATCH LIST | | | | | | |
|---|---|---|---|---|---|---|---|---|
| UP/DOWN INDICATOR | UP/DOWN INDICATOR | UP/DOWN INDICATOR 1316 | | | | | | |
| 1304 | 1310 | | | | | | | |
| 2ND PARTY RWA SELF INDICATOR | 1ST PARTY RANKING OF 2ND PARTY'S PROPERTY OR BUYER PROFILE | 1ST PARTY RATING OF 2ND PARTY'S PROPERTY OR BUYER PROFILE | PICTURE IF IT IS A PROPERTY (THUMB NAIL PICTURE) | MAP PAGE/ SECTION | PRICE | BED | BATH | GARAGE | SET UP SHOWING BUTTON ACTIVE IF BOTH ARE AT LEAST A RWA 4 |
| 1306 | 1312 | 1318 | 1320 | 1322 | 1324 | 1326 | 1328 | 1330 | 1332 |

Fig. 13

SYSTEM FOR MATCHING BUYERS AND SELLERS BASED ON BUYER SELLER PREFERENCES

CROSS-REFERENCE TO RELATED APPLICATIONS

This application is a continuation of U.S. application Ser. No. 10/893,458, filed Jul. 16, 2004, the specification of which is incorporated herein by reference.

INTRODUCTION

The traditional method of selling real or personal property begins with a seller coming to the conclusion that she/he is ready, willing and able to sell the property in question. Upon deciding to sell, the seller begins to market their property, by word of mouth, posting a for sale sign on the property, buying newspaper ads, marketing their property on a web site or in the case of real property, listing their property on a Multiple Listing Service, etc., thus commencing "market time". The inherent flaw with this system of marketing is that it begins at the point the seller has indicated they are ready, willing and able to sell. The property owner has lost the opportunity to market their property over time while capturing the level of buyer interest in the property as it changes. Likewise, the property owner currently does not have access to an efficient and unobtrusive method of monitoring the level of interest in their property before they are actually ready, willing or able to sell. Moreover, the sale of real or personal property may just be a question of terms and conditions. In which case, the current method of market exposure fails miserably.

For example, consider the case of a relocation buyer who is particularly attracted to the homes in a specific neighborhood or is enamored with local amenities etc. The choices of real property in the current market are limited to houses on a Multiple Listing Service or homes with a For Sale By Owner sign in the front yard. There is currently no way to input a buyer need into a system and notify home owners that someone is interested in moving into their neighborhood. Also, in the case of real property, the event that solicits the home owner's or buyer's ready, willing, and able status may be a "stay in touch" phone call, direct mail, door-to-door solicitation or attendance of an open house. All of which are blind events in which a real estate professional is hoping for positive results. There is no event driven bi-directional notification and communication conduit over time that connects buyers and sellers to each other and to real estate professionals and lenders. Likewise, a personal property owner, let's say of farm equipment has no way to catalog his/her equipment and market it in advance of being ready willing and able to sell, thus possibly missing out on a ready, willing and able buyer who would be willing to pay top dollar, thus allowing the seller to upgrade his or her equipment.

Real estate agents working in the current system are incredibly inefficient. One agent, may market their services for listings via advertising in publications, bus benches, costly direct mail, open houses where one may sit for hours hoping a prospective client will walk through the door. While completely different agents will be driving all over a particular region hoping they can find a house that is for sale, that meets their client's needs and that is not pending a closing or sold. Either way, whether an agent is looking for properties to list or buyers to represent, it is a guessing game. There is no current system that allows customers to indicate their readiness, willingness and ability to buy or sell.

If buyers and sellers had such a system they would be able to merely change a single Ready, Willing, and Able (RWA) indicator which would trigger system events notifying agents, buyers and sellers of their new rating. Other agents, buyers and sellers would then have the opportunity to respond to the event notifications they receive.

BRIEF DESCRIPTION OF THE DRAWINGS

FIGS. 3A and 3B are table diagrams representing a non-exhaustive list of a number of truth tables, represented in this example as ready, willing, and able truth tables for a buyer and a seller of property, which can be associated with the indicator level embodiments described herein.

FIG. 13 is a block diagram representing in more detail an embodiment for the "watchlist" block shown in FIG. 7.

DETAILED DESCRIPTION

Figure 1:
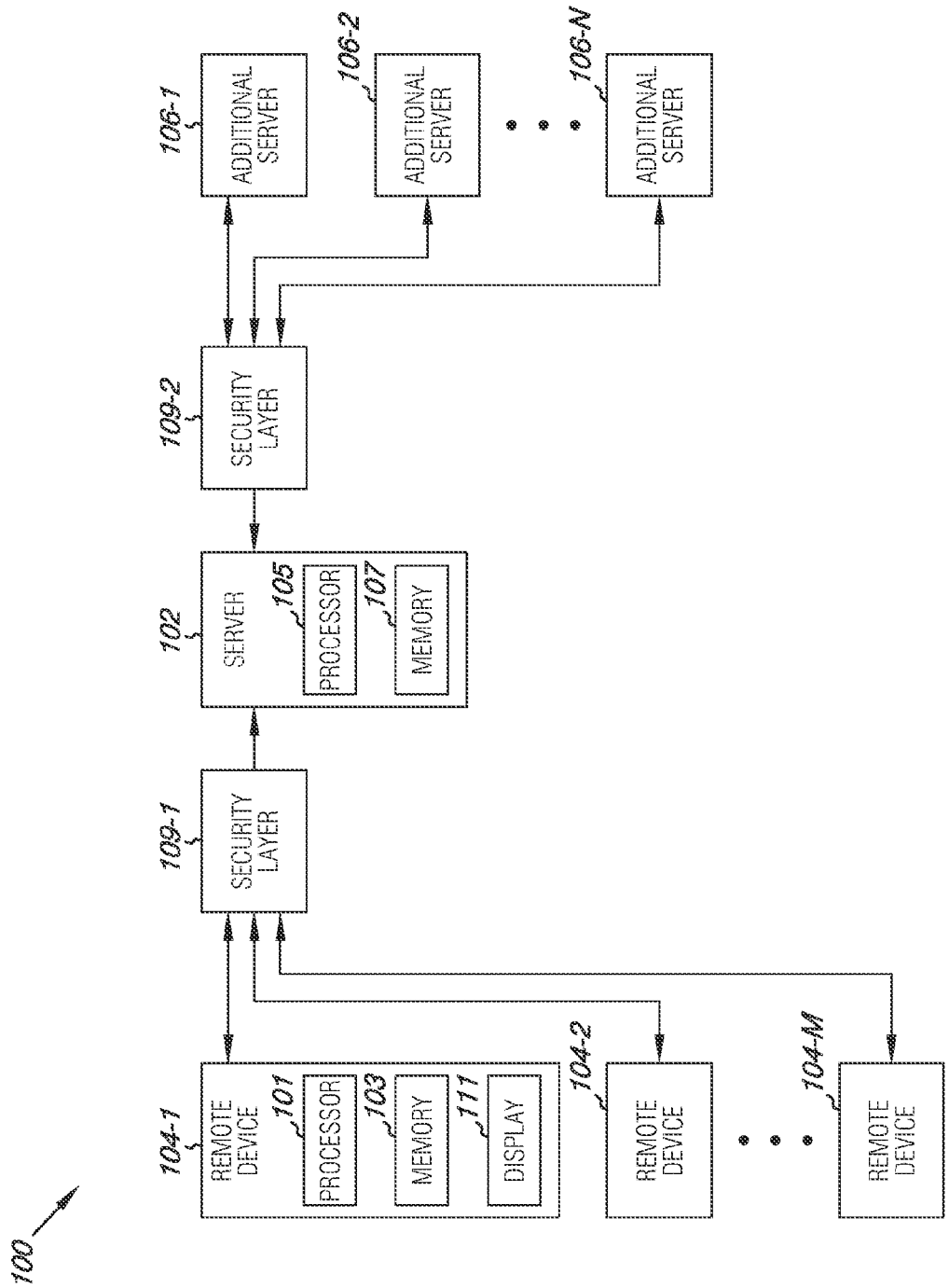
FIG. 1 is an illustration of a system embodiment according to the teachings of the present invention.

Embodiments of the present invention include methods, systems, and devices for property transactions. For example, in accordance with various embodiments of the present invention, there are provided prospective buyers and prospective sellers. The prospective buyers can enter their buyer needs into a computerized system along with an indicator having a number of levels representing, e.g., indicating, the buyer's readiness, willingness and ability to buy whatever they are interested in buying at that particular moment in time. In various embodiments this indicator is referred to as a Ready, Willing and Able (RWA) indicator. Likewise, prospective sellers can enter their seller needs into a computerized system along with their RWA indicator, indicating their readiness, willingness and ability to sell whatever they are interested in selling at that particular moment in time. Herein a reference to a "seller" may be to the seller, the seller's property or the combination thereof. In the various embodiments, these indicators having a number of levels, e.g., a RWA scale, are expressed as a range of numbers. By way of example and not by way of limitation, a RWA scale which ranges from 1-5 is used in various embodiments of the present disclosure. For example, in one embodiment Buyer RWA self ratings are defined as follows:

1: Will not buy
2: Neutral
3: May buy
4: Will buy for the right property with the right terms and conditions
5: Will inspect, tour or preview property (In the case of real property, buyer is pre-approved to buy property up to a certain dollar amount).

And, in one embodiment Seller RWA self ratings are defined as follows:

1: Will not sell
2: Neutral
3: May sell
4: Will sell for the right terms and conditions (In the case of real property if selling principle residence, identity has been verified).
5: Will allow and schedule, inspections, tours, previews etc. and will consider all offers from buyers with a "5" Ready, Willing and Able status.

One of ordinary skill in the art will appreciate upon reading this disclosure that the embodiments are not limited to the above example. And, as one of ordinary skill in the art will understand reading this disclosure, the embodiments described herein provide the ability to match motivated, ready willing and able buyers and sellers (e.g., as indicated by their RWA rating) whose needs match and enable them to have a meeting of the minds and engage in a successful business transaction.

According to the various embodiments described herein, there can be three primary means of matching buyers and sellers. These three exemplary means of matching buyers and sellers can include: user manually, albeit electronically, browsing profiles of interest and interacting with profiles to trigger a system event; user manually, albeit electronically, searching profiles based on certain criteria and interacting with profiles to trigger a system event; and, automated, event driven (e.g., unsolicited) and periodic computer generated search results or results of general automated/scheduled (e.g., unsolicited) system events. Additionally, in various embodiments, once a buyer or seller has found or received prospective matches the buyer or seller may add buyers or sellers to a Watch list, as described in more detail herein. In the event that a watched buyer or seller increases their associated indicator rating the watcher, e.g., watching party who placed another party or entity on the Watch list, will receive event notifications, notifying the watcher of activities associated with a party on the Watch list. For example, a watcher can receive a notification that a watched buyer or seller has changed their associated indicator rating, e.g., a watched RWA indicator status upgrade. Further, according to various embodiments, the watching party who placed another party or entity on the Watch list can execute instructions to establish the watcher's notification preferences.

As one of ordinary skill in the art will understand upon reading this disclosure, the embodiments can be performed by software/firmware (e.g., computer executable instructions also referred to as "code") operable on the devices shown herein or otherwise. The embodiments of the invention, however, are not limited to any particular operating environment or to executable instructions written in a particular programming language. Software/firmware, application modules, and/or computer executable instructions, suitable for carrying out embodiments of the present invention, can be resident in one or several locations.

FIG. 1 is an illustration of a system embodiment, including a number of device embodiments, according to the teachings of the present invention. The system embodiment shown in FIG. 1 includes a networked system 100. Various embodiments of the present invention include a property transaction device. For example, the embodiment shown in FIG. 1 includes a server 102 as the property transaction device.

Although the term server is used herein, embodiments of the invention are not limited to implementation on such a device and various embodiments can be stand alone devices or systems including a number of devices. It is intended that in embodiments using a server, the server 102 can be provided by any suitable type of computing device, such as personal computers, mainframes, and the like.

Server 102, shown in FIG. 1, includes a processor 105 coupled to a memory 107. Processor 105 and memory 107 can include any type of processor and memory in the art of computing and the various embodiments are not limited to where within a device or system a set of computer instructions reside for use in implementing the various embodiments of invention.

Memory can, for example, include Non-Volatile (NV) memory (e.g. Flash memory), RAM, ROM, magnetic media, and optically read media and includes such physical formats as memory cards, memory sticks, memory keys, CDs, DVDs, hard disks, and floppy disks, to name a few. Memory can include a Direct Access Storage Device (DASD) or be located on another peripheral device that is accessible over a network.

One of ordinary skill in the art will appreciate for reading this disclosure that such memory can include data stores, application programs (e.g., computer executable instructions), and the like.

In various embodiments, the server 102 can be connected to a number of additional devices 104-1, 104-2, . . . , 104-M, such as remote computing devices. Alphabetical designator "M" as used herein are intended to represent any number of additional devices, components, or entities being discussed. The various designators can represent any value whether or not the value is the same as a value represented by another designator. As stated above, the additional devices 104-1, 104-2, . . . , 104-M can be used to allow access to a system or to send information to the system.

Each remote device 104-1, 104-2, . . . , 104-M can include processor 101, memory 102, and display 111 capabilities. The display 111 can be included to provide feedback to a user and can include any of various types of computing device displays. The server 102 and/or remote devices 104-1, 104-2, . . . , 104-M are capable of including application programs (e.g., computer executable instructions) to cause a server 102 or other device 104-1, 104-2, . . . , 104-M to perform particular functions as described in more detail below. Examples of remote devices include, but are not limited to, cell phones, lap top computers, desk top computers, workstations, multifunction handheld communication devices (e.g., BlackBerryies), intelligent appliances, and the like. As one of ordinary skill in the art will appreciate upon reading this disclosure, the remote devices 104-1, 104-2, . . . , 104-M can include global positioning service (GPS) enabled devices with application programs, e.g., routing and cartographic software/firmware, included therein.

As shown in the embodiment of FIG. 1, devices 104-1, 104-2, . . . , 104-M can couple to the server 102 through a first security layer 109-1, or secure data network 109-1. In this way, security can be provided to the system, however the embodiments of the present invention are not limited to use of a security layer.

Additionally, devices 104-1, 104-2, . . . , 104-M can couple to the server 102, such as over various types of networks. For example, the devices 104-1, 104-2, . . . , 104-M can be coupled to the server 102 over a local area network (LAN), e.g. an Ethernet network. The devices 104-1, 104-2, . . . , 104-M can also couple to the server 102 over a wide area network (WAN), over the public switched telephone network (PSTN), and/or the Internet using transmission control protocol/Internet protocol (TCP/IP).

Networks, as used herein, can include wireless networks as can be accessed by desktop devices, laptop devices, mainframe devices, cell phones, multifunction devices (PDAs), and the like. Wireless networks can include Global System for Mobile communications (GSM) networks, American National Standards Institute (ANSI) networks, Public Wireless Local Area Networks (PWLANs) including Wi-Fi, among others. Thus, devices described herein can be coupled in either direct hardwired fashion, e.g. using copper, coaxial cable, optical fiber connections, and hybrid fiber-coax connection, and/or indirectly in a wireless fashion using remote electromagnetic signal transmission in the radio or microwave frequencies, e.g., RF.

The embodiment shown in FIG. 1 illustrates that the above described components can couple to additional servers and systems, 106-1, 106-2, . . . , 106-N, over a network as the same has been described above. Such additional servers and systems, 106-1, 106-2, . . . , 106-N, can be maintained by other organizations, or entities. The additional servers and systems, 106-1, 106-2, . . . , 106-N, can include core data stores accessible by the server 102 according to definable access rights. The additional servers and systems, 106-1, 106-2, . . . , 106-N, can include databases and executable instructions and/or application programs to operate on data and can possess processing and routing capabilities over a PSTN or other network as described above.

The additional servers and systems, 106-1, 106-2, . . . , 106-N, can include proprietary databases, data modules, and software systems maintained by a third party or the like. As shown, the additional servers and systems, 106-1, 106-2, . . . , 106-N, can be coupled to the server 102 through a second security layer 109-2, or secure data network 109-2 such that data from the additional servers and systems, 106-1, 106-2, . . . , 106-N, can be securely exchanged with the server 102, e.g., third party servers connecting to first party servers via TCP/IP utilizing simple object access protocol and XML through a web service.

The server 102, the number of remote devices 104-1, 104-2, . . . , 104-M, and the additional servers and systems, 106-1, 106-2, . . . , 106-N, can all include one or more computer readable mediums having computer executable instructions. As mentioned above, these computer readable mediums can include devices such as a disk drive for reading data storage media, e.g. a compact disc, and/or computer readable medium such as random access memory (RAM) and read only memory (ROM), non-volatile, optical, or any other type of memory storage medium.

Figure 2:
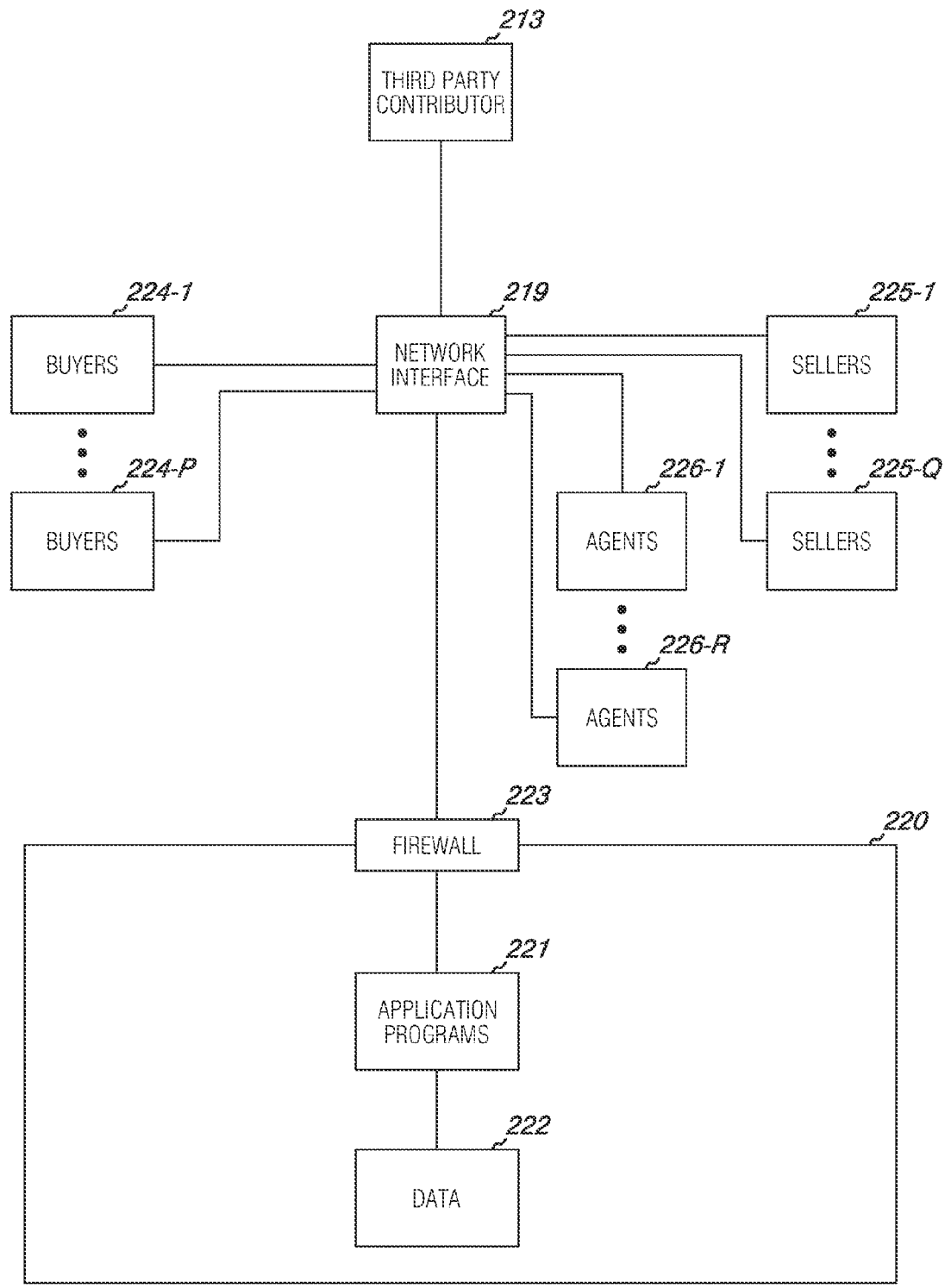
FIG. 2 is another illustration of a system embodiment according to the teachings of the present invention.

FIG. 2 is another illustration of a system embodiment according to the teachings of the present invention. The embodiment of FIG. 2, illustrates a property transaction device 220 coupled to a network interface 219. The property transaction device 220 can include a server, such as server 102 and/or additional servers 106-1, . . . , 106-N as illustrated in FIG. 1, having processor, memory, and user interface resources as described above. Network interface 219 can include a number of suitable wireless and hardwired network interfaces such as the LANs, WANs, PSTNs, Internet, GSM, ANSIs, and/or PWLANs including Wi-Fi, as described above. As shown in the embodiment of FIG. 2, the property transaction device 220 can include application programs 221 and various data stores 222 and be coupled to the network interface 219 through a fire wall 223, as the same are known and understood by one of ordinary skill in the art, for security purposes.

As illustrated and discussed in further detail in connection with FIGS. 3-26, the property transaction device 220 includes one or more program modules associated with application programs 221 and/or data 222. According to various embodiments the application programs 221 and modules include program instructions storable in the memory and executable by the processor to operate on various input information/data and to output, present and/or otherwise produce resultant data from operation of the instructions in the input information/data. As one of ordinary skill in the art will appreciate upon reading this disclosure, embodiments include various selectably configurable sets of logic. According to various embodiments, and as discussed in more detail below, the application programs 221 and program modules include program instructions storable in the memory and executable by the processor to facilitate property transactions.

In the embodiment of FIG. 2 a third party contributor (TPC) block is illustrated as 213. The TPC 213 can include a remote device or remote client, shown as 104-1, 104-2, . . . , 104-M, and/or can include a server, such as servers 106-1, 106-2, . . . , 106-N, in FIG. 1. As shown in the embodiment of FIG. 2 the TPC 213 can be coupled to the property transaction device 220 via a network interface 219 as the same has been described above. The TPC 213 can be used to provide third party content, or data exchange/synchronization, e.g., advertising, customer relationship management software/system synchronization, and/or affiliate content, into the various embodiments of the invention.

That is, third party content 213 information can be used to add additional content to the various embodiments of the present invention and likewise send data to a third party over the same or similar secure connection. By way of example and not by way of limitation, and as will be discussed in further detail below, in various embodiments third party content can include regional map data as used by a regional multiple listing service (MLS). Alternatively and/or additionally, another example of third party content can include data on top listing agents for real property in a particular market by volume and/or transaction dollars. As yet another example, the third party content may include data associated with market share analysis relative to real property map data, transaction volume, or dollar. As yet another example, the third party content may include tax data information associated with a particular parcel of real property. As yet another example, the third party content may include data associated with an auction bidding process hosted by a third party. As yet another example, the third party content may include any customer or property data from a third party device or system, e.g., synchronization with customer relationship management software. Embodiments, however, are not limited to these examples. Further, by way of example and not by way of limitation, comparative data can be provided and used to compare the performance of a particular individual against performance data available for other similarly situated individuals. Information on a particular individual can be compared with that individual's own assessment information over time as well as against similarly situated individuals within a particular region or globally. According to various embodiments the above third party content can be used in assessing an individual's performance, action planning, bidding, etc., as one of ordinary skill in the art will appreciate upon reading this disclosure. In various embodiments, the third party content information can be included and analyzed within the system property transaction device 220 itself, and/or the data collection results of various information can be shared outside of the system property transaction device 220 with other entities.

The embodiment shown in FIG. 2 also illustrates that a number of entities, e.g., buyers 224-1 to 224-P, sellers 225-1 to 225-Q, and agents 226-1 to 226-R can connect to the property transaction device 220 through a network interface 219, as the same have been described herein. As one of ordinary skill in the art will appreciate upon reading this disclosure, the entities needed within any device or system may be altered to meet the individual market needs or practices. In various embodiments, such as the example embodiment of FIG. 2, particular buyers 224-1 to 224-P, sellers 225-1 to 225-Q, and agents 226-1 to 226-R can use remote devices, such as remote devices 104-1, 104-2, . . . 104-M shown in FIG. 1, to input and retrieve (e.g., exchange) information with the property transaction device 220 through the network interface 219. As one of ordinary skill in the art will appreciate, in some scenarios, certain entities will only indirectly access or interface with the property transaction device 220 on restricted permission based access. As one of ordinary skill in the art will appreciate upon reading this disclosure, buyers, sellers, and agents access the property transaction device 220 at a variety of levels and for a variety of reasons. As will be explained in more detail below, these various parties may access the property transaction device 220 for inputting and retrieving information. Likewise, access can be for purposes of updating and/or modifying information. The embodiments are not limited to these examples.

As one of ordinary skill in the art will appreciate upon reading this disclosure, program embodiments associated with the property transaction device 220 can be added in complement from other host sources, e.g., connected as part of a LAN or WAN, or otherwise, or entirely managed within the property transaction device 220 acting as an application service provider (ASP). Thus, in various embodiments program instructions can be hosted entirely on the property transaction device 220, shared with other third party host devices, e.g., additional server systems 106-1, . . . , 106-N (shown in FIG. 1) coupled over the PSTN, Internet or otherwise, and/or hosted entirely on a separate entity's system and can be managed by the property transaction device 220 through a network interface 219. Embodiments of the invention are not so limited.

The embodiment of FIG. 2 illustrates application programs 221 for receiving buyer, seller, and/or agent information and which are capable of executing instructions to analyzing such information. Although application programs 221 can reside on a server such as server 102 and/or servers 106-1, . . . , 106-N as described in connection with FIG. 1, the embodiments described herein are not limited to a server computing environment. As shown in FIG. 2, the application programs 221 can interface with one or many data stores 222, e.g. data servers, enterprise level databases, and the like. Embodiments, however, are not limited to these examples or to any particular operating and/or network environment (distributed or otherwise) or server configuration. The description included herein is provided for purposes of illustration.

As one of ordinary skill in the art will appreciate upon reading this disclosure, data stores 222 can have restricted access to allow access only to authorized individuals, e.g., authorized administrative users, etc. For example, a server can include a data store that can include a number of separate partitions to store data and programs for different entities, geographical locations, users, and the like. A server can also include a data store that can include a number of separate partitions to store data and programs for each selectably configured set of business rule according to the program embodiments described herein. As described in more detail below, the selectably configured business rules can include establishing formatting, branding usage, content and content handling rules, and the like. Any number of computing devices, such as servers; application programs; and/or data can be distributed as part of the property transaction device 220 embodiments described herein.

FIGS. 3A and 3B are table diagrams representing a number of truth tables, represented in this example as ready, willing, and able truth tables for a buyer and a seller of property, which can be associated with the indicator level embodiments described herein.

The embodiments shown in FIGS. 3A and 3B highlight some possible relationships between a buyer and seller over time and are listed by example and not limitation. Currently, property owners and service providers market their property, products and services when they are ready wiling and able to sell, thus commencing "market time". The seller's ultimate objective during the "market time" is to engage in a successful business transaction with a buyer who is ready, willing and able to buy.

As one of ordinary skill in the art will appreciate upon reading this disclosure, a buyer and seller's readiness, and willingness to sell an item of property can be impacted by their state of mind at any point in time. A buyer and/or seller's state of mind at any point in time can be impacted by a number of present life circumstances. As used herein, by way example and not by way of limitation, present life circumstances can include a new birth, a loss of a family member, a job relocation, a separation, a promotion, a health condition, financial circumstances, etc.

Further, as used herein by way of example and not by way of limitation, a buyer and seller's "readiness" (R) can include that individual's preparedness based on a state of mind resulting from the weighing of the pros and cons regarding buying or selling property or services at a particular point in time.

The buyer and seller's "willingness" (W) can include a state of mind in which the individual wants or desires to conduct a transaction if all terms and conditions are acceptable without undue duress or external force or influence.

The buyer and seller's "ableness" (A) can include a state of being of the individual's awareness of capability (e.g., mental, physical, financial, legal) taking into account external and internal forces acting upon an individual and the resulting likelihood that an individual could participate in a transaction even if the individual was completely ready and willing. For example, the spouse of the owner may refuse to sell an item of property where the sale requires two signatures to sell or a buyer is ready and willing to buy property but can not get a required loan pre-approval.

To illustrate an example, a seller may be completely willing to sell their house for fair market value. He/she may have no barriers standing in his/her way preventing him/her from selling, thus being completely able. The only problem may be that a best friend of the seller's child's may live next door. In this example, the seller will determine the "weight" that the next door friend has in the seller's RWA rating, e.g., impact on the seller's state of mind primarily affecting the seller's "readiness" factor but for simplicity's sake all RWA indicators are expressed as an aggregate of the three individual state of mind ratings.

In a given situation, a numerical representation that a buyer and seller provide as an indicator level will be a subjective representation of the weights given to any one of the above example factors and life circumstances. In various embodiments, certain business rules may restrict the numerical representation or change from one numerical representation to another but, outside of such business rules, an individual's choice of numerical representation will vary from individual to individual and from circumstance to circumstance. For example, given the exact same circumstances in the example above, two different individuals are likely to "weight" the factors and life circumstances differently in choice of numerical representation.

As another example, as one of ordinary skill in the art will appreciate upon reading this disclosure, a buyer may be completely prepared to buy a house and completely able to buy a house but is unwilling to agree to look at a property. Again, the factors, life circumstances and numerical indicator level ratings discussed above are subjective and can be determined by the individual given general rating guidelines and business rules described in the network system embodiments and property transaction device embodiments discussed below.

As one of ordinary skill in the art will appreciate upon reading this disclosure and with reference to the indicator level embodiments (e.g., RWA ratings) described herein, buyers and sellers can leverage time thus extending the traditional concept of market time to "all time". Thus, rather than waiting until a party is ready willing and able, e.g., expressed as an RWA rating of true (T), true (T), and true (T), buyers and sellers are able to network their needs in advance of traditional "market time". That is, according to the various embodiments, buyers and sellers are able to network their needs in advance of either party actually being ready willing and able to sell and as soon as a transaction closes a buyer becomes a future seller with a RWA rating.

Figure 4:
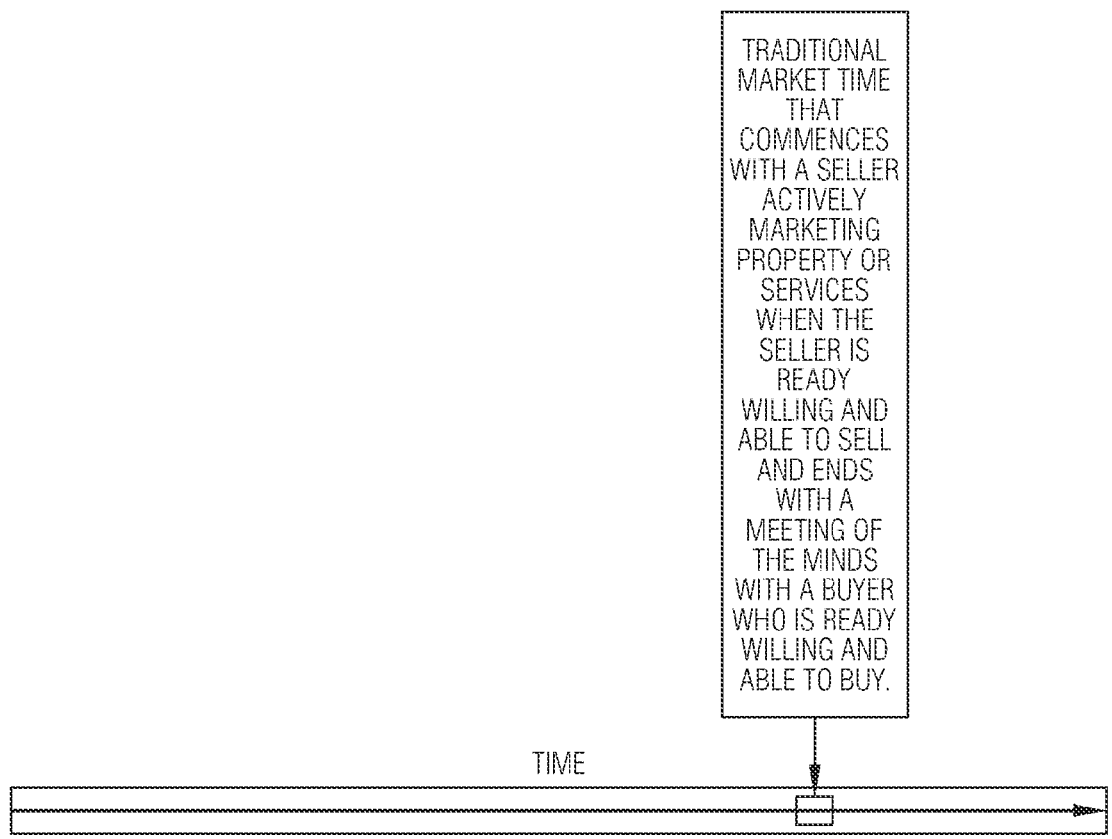
FIG. 4 is a time line embodiment associated with property transaction embodiments of the present invention including the ready, willing, and able truth tables shown in FIG. 3.

FIG. 4 is a time line embodiment associated with property transaction embodiments of the present invention including the ready, willing, and able truth tables shown in FIGS. 3A and 3B.

As the diagram indicates, traditional "market time" commences with a seller actively marketing property or services when the seller is ready willing and able to sell (e.g., a RWA rating of true (T), true (T), and true (T), and ends with a meeting of the minds with a buyer who is ready willing and able to buy (e.g., a RWA rating of TTT).

In contrast to traditional market time, the embodiments described herein provide a system and methodology to allow for real property, personal property and services to be marketed all the time, before during and after what would be considered traditional market time. Stated in other terms, the embodiments described herein are effectively a market making methodology and system.

Figure 5:
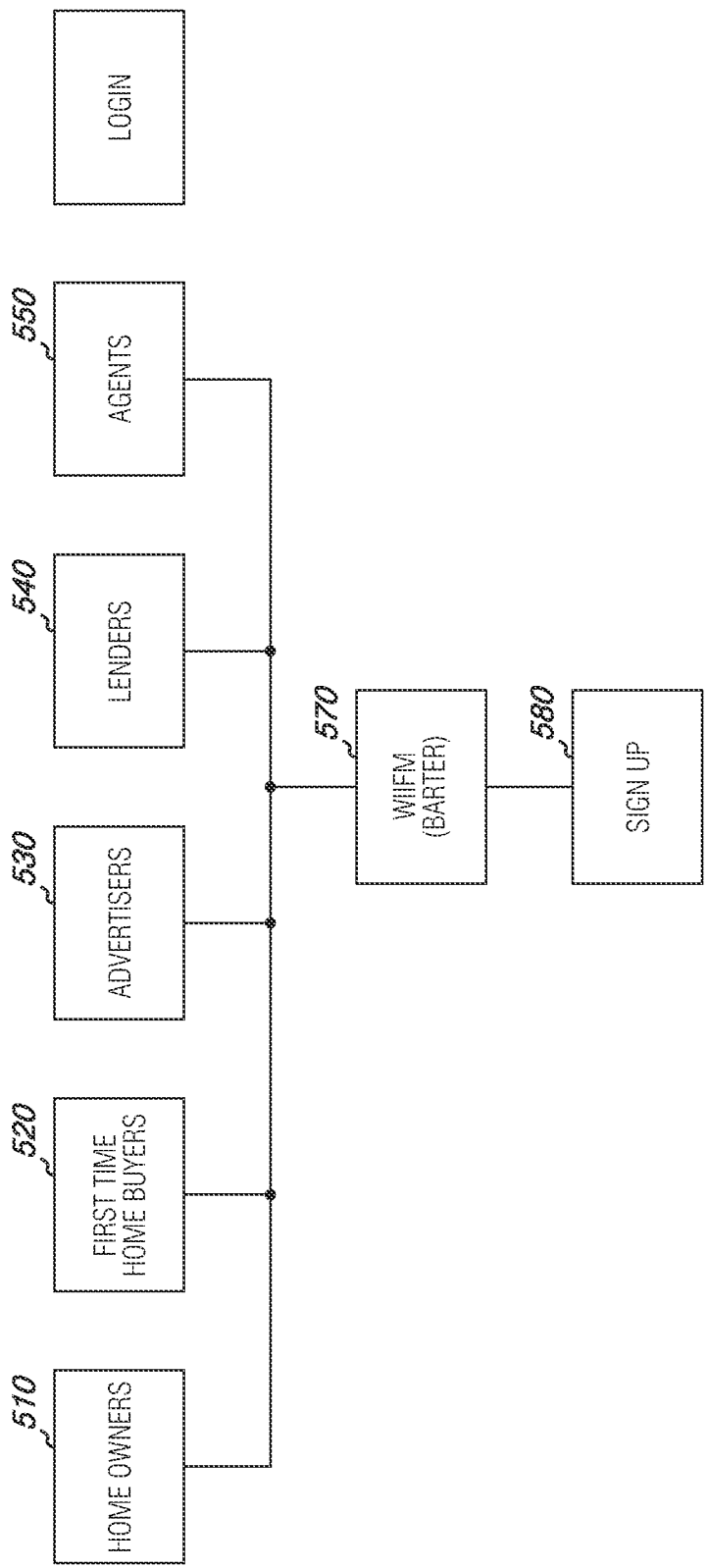
FIG. 5 illustrates an embodiment for a public interface.

FIG. 5 illustrates an embodiment for a public interface. As one of ordinary skill in the art will appreciate upon reading this disclosure the public interface can be provide via a network interface to a property transaction server as the same has been illustrated and described in connection with FIGS. 1 and 2.

The methodology and system could be implemented in numerous ways within various markets, although this description will focus on the implementation of the methodology as exemplified in a real estate professional/agent and lender assisted real estate transaction between a buyer and a seller. This embodiment of FIG. 5 illustrates the links to roles that "public" users would assume once they have determined that there is value in bartering personal information for membership whether it is limited or full membership. In the embodiment of FIG. 5, the illustrated roles include; home owners 510, first time home buyers 520, advertisers 530, lenders 540, and agents 550. Embodiments, however, are not limited to these examples.

As illustrated in the embodiment of FIG. 5 a public user can login into the system through a "login" module, shown as 560, including defined business rules for login and access as the same will be known and understood by one of ordinary skill in the art. In various embodiments, upon logging in to the system, users will signify the role they believe they are by clicking on a hyperlink on a web page. Each of the roles illustrated above can be implemented as program modules including computer executable instructions in the form of software and/or firmware to operate on received input data.

As illustrated in the embodiment of FIG. 5, each of the roles can respectively provide informational data, shown in block 570, educating a prospective public user as to the benefits of interacting with the system. Stated otherwise, the informational data provided in block 570 and associated with a particular role will address the WIIFM (What's in it for me?) question. As shown in block 580, upon determining that the benefits of membership outweigh the reasons not to part with personal information, the public users can proceed to sign up with the system. As described in more detail in connection with FIG. 6, upon sign up, public users will be identified within the system as members with specific roles.

Figure 6:
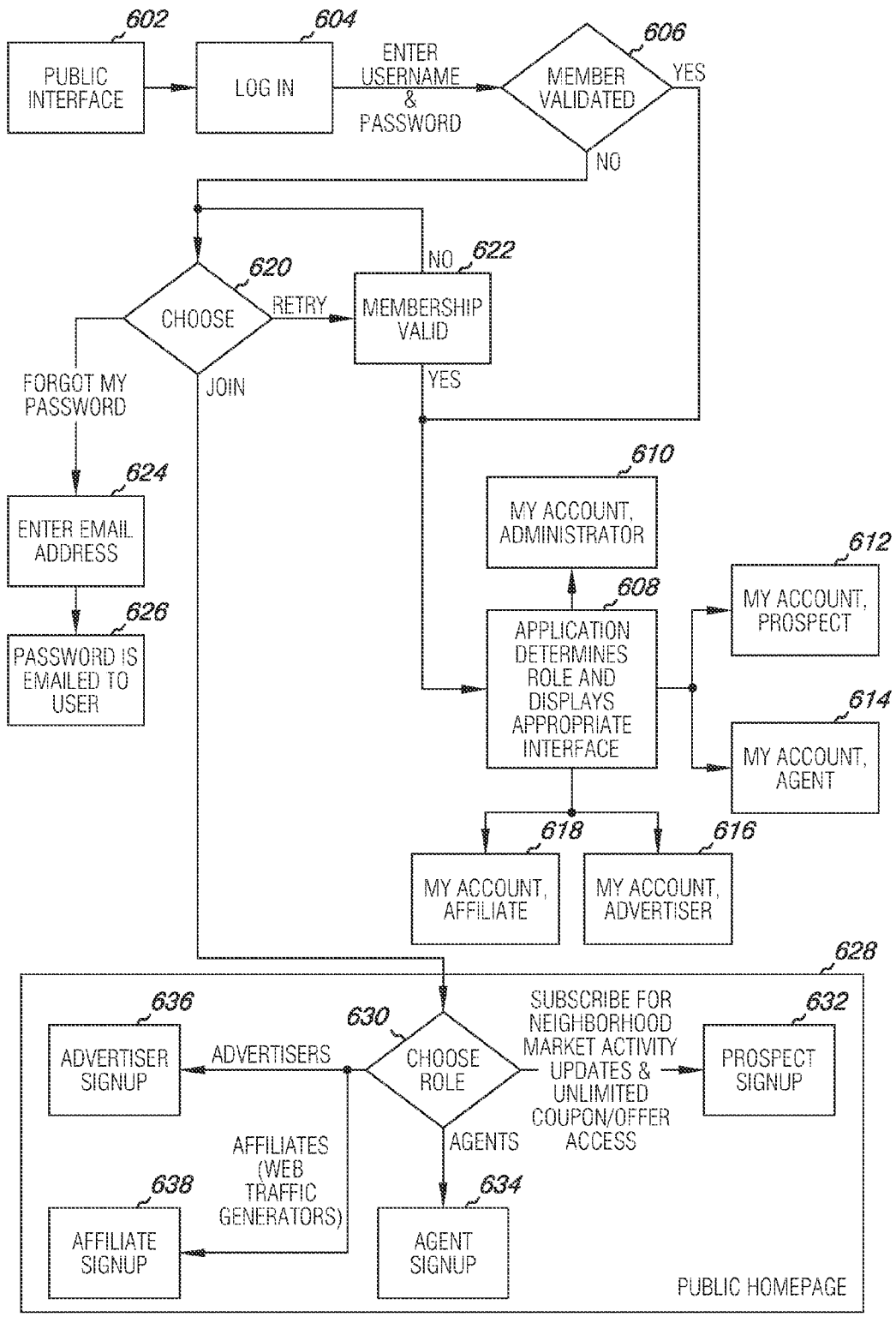
FIG. 6 is a block diagram representing a login embodiment.

FIG. 6 is a block diagram representing a login embodiment. As shown in the embodiment of FIG. 6, the login functionality will direct validated users to a user specific "homepage" based on their defined role within the system. Thus, as described above, a public interface 602 can be provided via a network interface to a property transaction server as the same has been illustrated and described in connection with FIGS. 1 and 2. The public interface 602 will lead a user to a login page, as shown in block 604, where the user can enter a username and password. As shown in block 606, program instructions can execute to verify whether a particular member is validated. One of ordinary skill in the art will appreciate the manner in which program instructions can execute to verify member validation.

As shown in the embodiment of FIG. 6, if a member is validated they can proceed to block 608 where a program application determines the member's role and displays an appropriate interface. As illustrated in the embodiment of FIG. 6, the program application shown in block 608 can execute instructions to interact with an account administrator program module shown at 610. Collectively, the program application module 608 and account administrator module 610 may, upon executing instructions and operating on available data, determine that the member user is an "account prospect", e.g., buyer and/or seller, and lead the member user to an account prospect interface as shown at block 612. The program application module 608 and account administrator module 610 may, upon executing instructions and operating on available data, determine that the member user is an "account agent" and lead the member user to an account agent interface as shown at block 614. The program application module 608 and account administrator module 610 may, upon executing instructions and operating on available data, determine that the member user is an "account advertiser" and lead the member user to an account advertiser interface as shown at block 616. Similarly, the program application module 608 and account administrator module 610 may, upon executing instructions and operating on available data, determine that the member user is an "account affiliate" and lead the member user to an account affiliate interface as shown at block 618. Each of these example interfaces will be expanded upon in some detail below.

As shown in the embodiment of FIG. 6, if a member is not validated in block 606 then a public user can choose at 620 to "retry" validating membership in block 622. If the "retry" is successful, the member user will proceed to the program application module 608 as described above. Additionally, the system can troubleshoot when a public user has forgotten their password and allow the public user to enter an email address at block 624 and the system can operate on this information to email a password to a public user as shown at block 626.

Alternatively, if it is determined that a public user is not currently a member user the public user can be offered the opportunity to join membership through a public home page as shown at block 628. As shown in the embodiment of FIG. 6, a public user wishing to join can choose a role as shown at block 630. By way of example and not by way of limitation, a public user can choose to subscribe as an account prospect 632 and be taken to a prospect signup page. In various embodiments, a user subscribing as an account prospect may receive market activity information relating to their particular item of property transaction and other promotional and/or coupon offer access. Additionally, by way of example and not by way of limitation, a public user can choose to subscribe as an account agent 634 and be taken to an agent signup page. Further, by way of example and not by way of limitation, a public user can choose to subscribe as an account advertiser 636 and be taken to an advertiser signup page. Alternatively, by way of example and not by way of limitation, a public user can choose to subscribe as an account affiliate 634 and be taken to an affiliate signup page. Embodiments are not limited to these examples.

Figure 7:
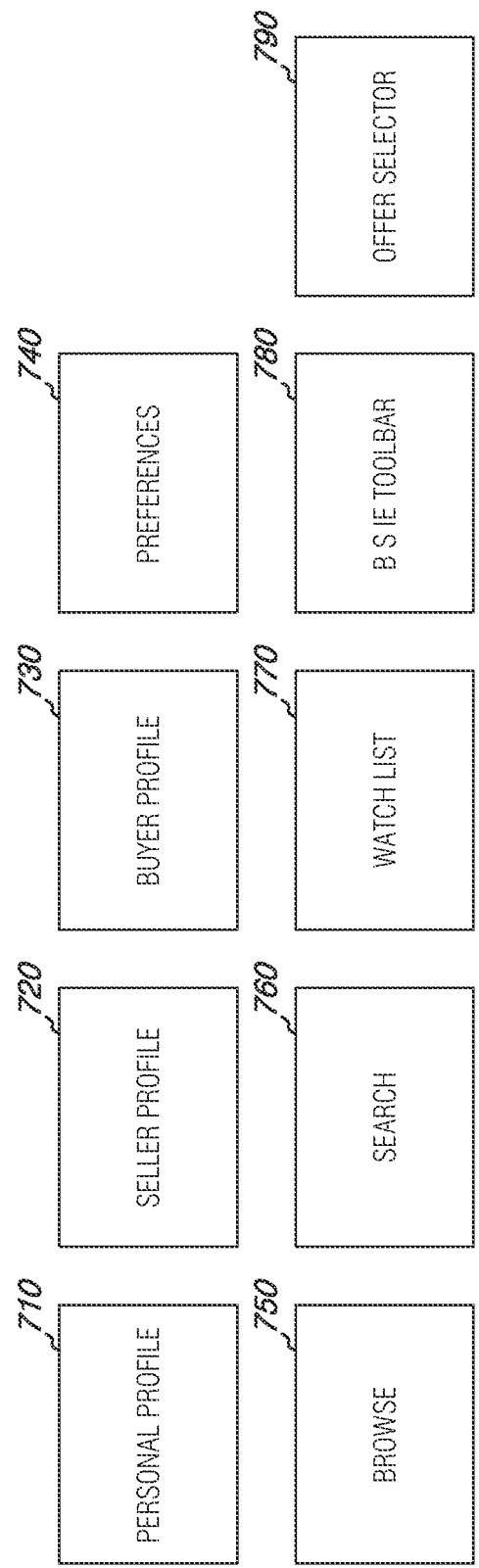
FIG. 7 is a block diagram representing in more detail an embodiment for the "my account prospect" block shown in FIG. 6.

FIG. 7 is a block diagram representing in more detail an embodiment for the "my account prospect" block 612 shown in FIG. 6. As mentioned above in connection with FIG. 6, when buyer and seller member users login to the system they will be directed to the "my account prospect" page. As shown in the embodiment of FIG. 7, the "my account prospect" page can include a number of links to additional program modules which provide various additional functionality. In the embodiment of FIG. 7, the additional functionality is shown as link to a personal profile 710, a seller profile 720, a buyer profile 730, a preference link 740, a browse function 750, search function 760, a watch list link 770, a buyer/seller toolbar 780, and an offer selector link 790. Embodiments, however, are not limited to these examples. The personal profile 710 will allow buyers and sellers to provide input data to enter their personal contact information. The offer selector link 790 will allow buyers and sellers to express their interests in business from which they would like to receive special offers. Each of these program modules and their associated functionality will be explained further in the Figures which follow.

Figure 8:
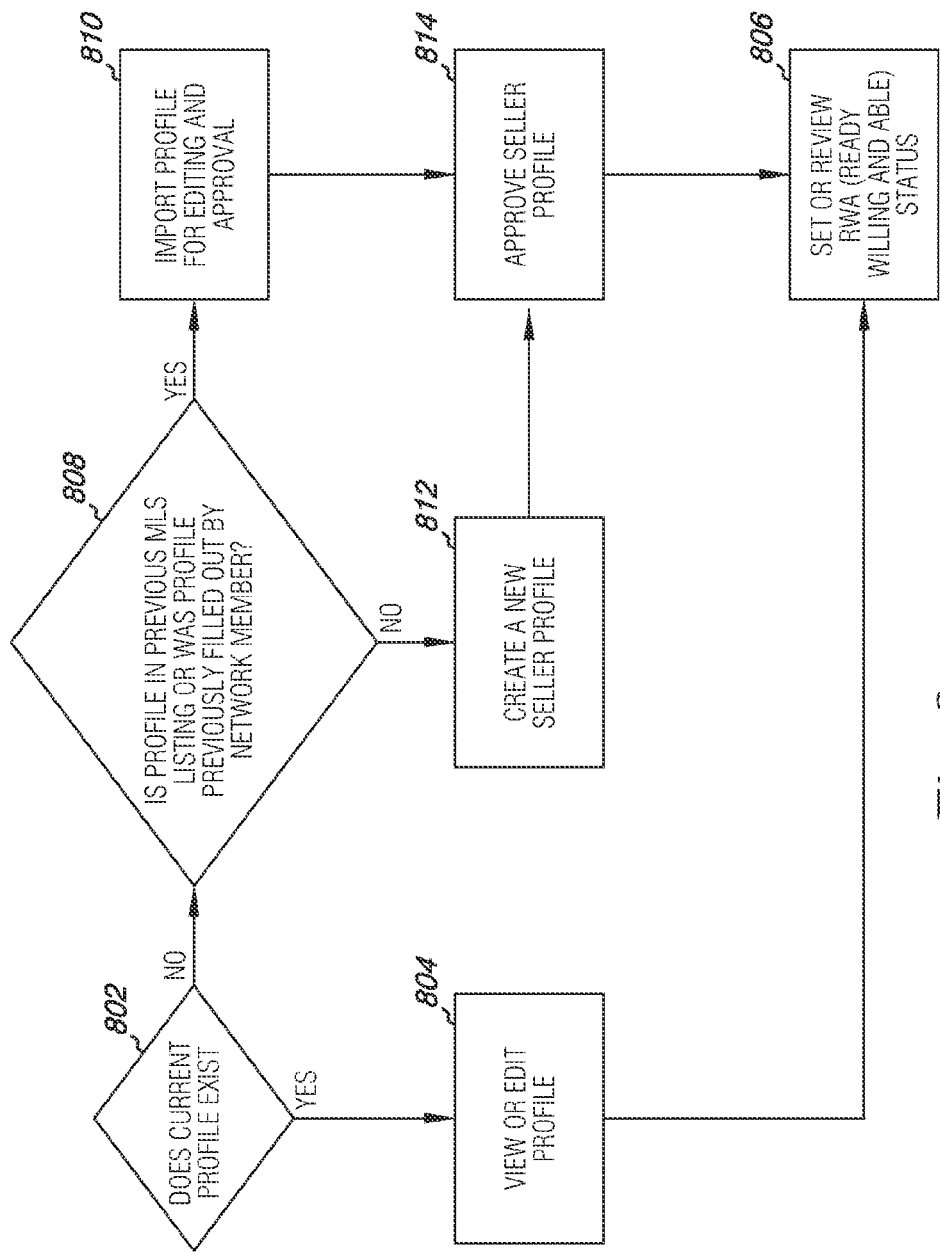
FIG. 8 is a block diagram representing in more detail an embodiment for the "seller profile" block shown in FIG. 7.

FIG. 8 is a block diagram representing in more detail an embodiment for the "seller profile" block 720 shown in FIG. 7. As illustrated in the embodiment of FIG. 8, within the seller profile 720 the seller member user will be able to add a new profile, edit their profile, and import a profile and ultimately set an indicator, e.g., a Ready, Willing and Able indicator, in association with a particular piece of property for the seller member user. As one of ordinary skill in the art will appreciate upon reading this disclosure, the system will allow for multiple properties to be marketed by the same seller within a seller member user profile.

By way of example and not by way of limitation, a seller profile program module can execute instructions through which a seller member user can first identify whether a current profile exists, as shown at block 802. If one or more current profiles do exist, then the seller profile program module can execute instructions, based on seller member user input, to allow a seller member user to select a particular profile to view and/or edit, as shown at block 804. As shown in the embodiment of FIG. 8, as part of editing a given seller profile, a seller member user can set, update, change, or otherwise modify an indicator level associated with that given seller profile as shown in block 806, e.g., set, modify, or review a RWA status indicator as the same has been described herein.

As illustrated in the embodiment of FIG. 8, if a seller profile does not currently exist within a particular seller's profile, the seller profile program module can execute instructions through which a seller member user can check to see whether a profile exists in a multiple listing service (MLS) previous listing or if a profile has been completed by another network member, as shown at block 808. As shown in the embodiment of FIG. 8, if a profile for a particular item of property does exist, whether in an MLS listing or as completed by another network member, the seller profile program module can execute instructions to import a particular profile into this particular seller member user's profile for editing and approval, as shown at block 810.

If however, a profile for a particular item of property does not exist, e.g., does not exist in an MLS listing or as completed by another network member, the seller profile program module can execute instructions to allow a seller member user to create a new seller profile relating to a particular item of property, as shown in block 812. Further, as shown in the embodiment of FIG. 8, whether a seller member user imports and edits an existing profile and/or creates a new one the seller profile program module can execute instructions to allow a seller member user to approve the profile, as shown at block 814. From an approved seller profile in block 814 the seller member user can proceed to set, update, change, or otherwise modify an indicator level associated with that given seller profile as discussed above in connection with block 806.

Figure 9:
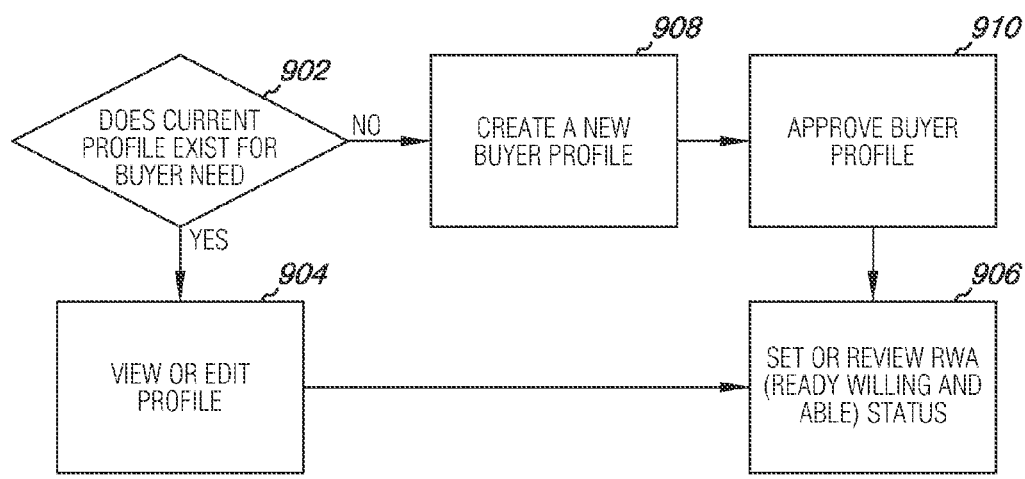
FIG. 9 is a block diagram representing in more detail an embodiment for the "buyer profile" block shown in FIG. 7.

FIG. 9 is a block diagram representing in more detail an embodiment for the "buyer profile" block 730 shown in FIG. 7. As illustrated in the embodiment of FIG. 9, a buyer may create a buyer profile, view the buyer need(s) the buyer has entered with a previous profile and view, set or alter the buyer ready, willing and able indicator for one of possible many buyer profiles for a single buyer.

By way of example and not by way of limitation, a buyer profile program module can execute instructions through which a buyer member user can first identify whether a current profile exists, as shown at block 902. If one or more current profiles do exist, then the buyer profile program module can execute instructions, based on buyer member user input, to allow a buyer member user to select a particular profile to view and/or edit, as shown at block 904. As shown in the embodiment of FIG. 9, as part of editing a given buyer profile, a buyer member user can set, update, change, or otherwise modify an indicator level associated with that given buyer profile as shown in block 906, e.g., set, modify, or review a RWA status indicator as the same has been described herein.

As illustrated in the embodiment of FIG. 9, if a buyer profile does not currently exist within a particular buyer's profile, the buyer profile program module can execute instructions to allow a buyer member user to create a new buyer profile relating to a particular item of property, as shown in block 908. Further, as shown in the embodiment of FIG. 9, once a buyer member user creates a new profile the buyer profile program module can execute instructions to allow a buyer member user to approve the profile, as shown at block 910. From an approved buyer profile in block 910 the buyer member user can proceed to set, update, change, or otherwise modify an indicator level associated with that given buyer profile as discussed above in connection with block 906.

Figure 10:
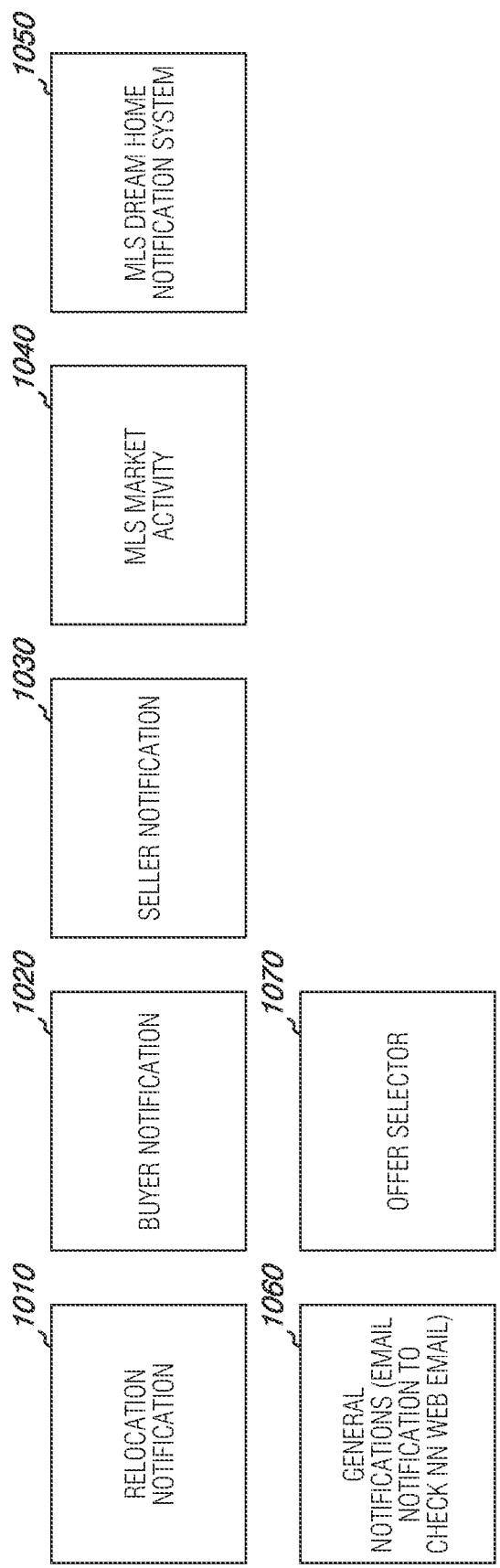
FIG. 10 is a block diagram representing in more detail an embodiment for the "preferences" block shown in FIG. 7.

FIG. 10 is a block diagram representing in more detail an embodiment for the "preferences" block 740 shown in FIG. 7. As shown in the embodiment of FIG. 10, the preferences block 740 can include a relocation notification link 1010, a buyer notification link 1020, a seller notification link 1030, an MLS market activity link 1040, an MLS notification link 1050, a general notifications link 1060, and an offer selector link 1070. Embodiments, however, are not limited to these examples.

According to various embodiments the relocation notification link 1010 includes instructions which can be executed by a processor to selectively enable or disable, e.g., turn on or off, a notification setting associated with relocations and an item of property. For example, an owner of real property and who is participating in the system and/or property transaction device embodiments described herein can elect to turn on this feature in order to be notified of a relocation buyer's interest in property in the owner's neighborhood. As will be described in more detail below, if a relocation buyer likes a particular neighborhood and would like to see if their buyer need is interesting to a home owner. According to various embodiments, a buyer participating in the system and/or property transaction device embodiments could independently access the system to configure or a buyer need description (as the same will be understood upon reading this disclosure) and/or an agent participating in the system and/or property transaction device embodiments could assist a relocation buyer in putting together a relocation buyer profile, e.g., buyer need description, along with possible neighborhoods of interest.

Thus, in one example, a seller's preference setting 1030 can include an indicator representing that a seller would like to receive notification that a buyer may be interested in the seller's property. And, a buyer's preference setting 1020 can include an indicator representing that a buyer would like to receive notification that a seller in a neighborhood of interest to the buyer may be interested in selling property in that particular neighborhood.

As one of ordinary skill in the art will appreciate upon reading this disclosure, buyer notifications and seller notifications can accommodate a range of sensitivity adjustments. In other words, the buyer notifications and seller notifications, or other items associated with the preferences block, can execute instructions which allow a user to filter out notifications based on certain criteria. For example, a buyer may adjust one of the buyer notification settings to a 5 indicator level, e.g. RWA rating, to represent that the buyer only wishes to receive notifications when a seller is fully ready, willing and a to culminate a transaction relating to a particular item of property. This would result in the buyer only receiving seller notifications from sellers who have switched their RWA indicator to a "5".

According to various embodiments, the MLS "My Neighborhood" Market Activity link 1040 includes instructions which can be executed to allow sellers to adjust the frequency with which they receive email updates regarding their neighborhood real estate market activity. Similarly, the MLS "Dream Home" Notification System includes instructions which can be executed to allow buyers to regulate the frequency and format of the emails the buyer receives regarding matches to the buyer's buyer profile.

According to various embodiments, the general notifications link 1060 includes instructions which are executable to selectably define system generated notifications to be sent to notify a user that an event has occurred which may affect a buying or selling decision. In various embodiments, the offer selector link 1070 includes instructions which are executable to collect more precise information about a buyer or seller which will increase the likelihood that the advertising displayed on the website and within the buyer and seller emails are appealing enough for the buyer and or seller to read the offer or coupon, print it out and redeem it.

One of ordinary skill in the art will appreciate upon reading this disclosure that various elements associated with the preferences block may be added, deleted and/or modified to suit the needs or as tailored to a particular market, depending on the types of property or services that are being marketed.

Figure 11:
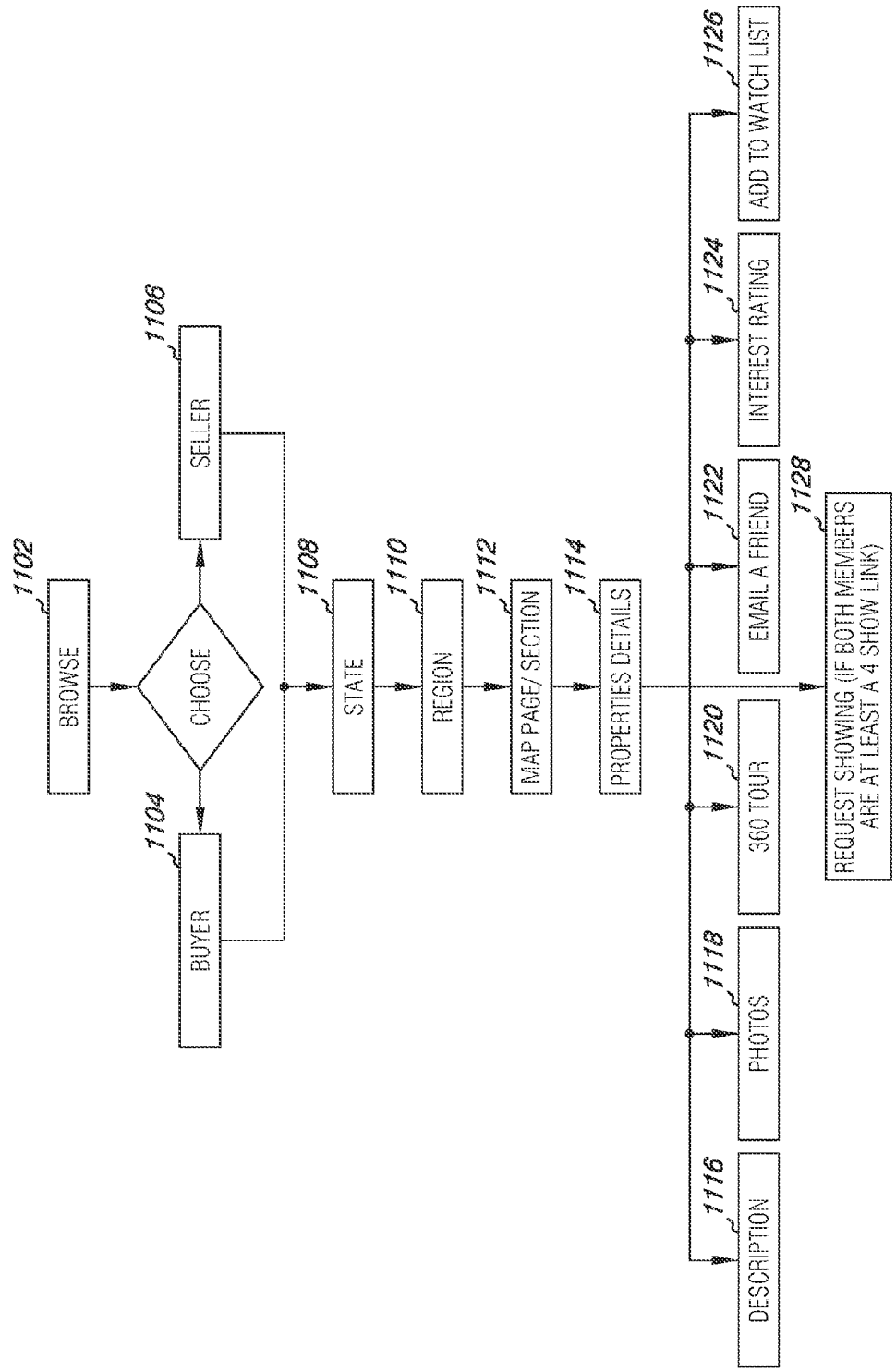
FIG. 11 is a block diagram representing in more detail an embodiment for the "browse" block shown in FIG. 7.

FIG. 11 is a block diagram representing in more detail an embodiment for the "browse" block shown in FIG. 7. In the example embodiment of FIG. 11, the browse diagram refers to real property. Thus, the embodiment of FIG. 11 shows that from a browse option 1102, a user can choose between a buyer 1104 and a seller option 1106, and then further define a state 1108, a region 1110, a map page and section 1112, property details, including description 1116, photos 1118, a 360 degree tour 1120, etc. The browse diagram is similar to traditional web property browsing, except that in accordance with embodiments of the present invention, a user (e.g., potential buyer, seller, and/or agent) who is researching her/his competition may pinpoint her/his search down to a map section or neighborhood. One of ordinary skill in the art will appreciate the manner in which this can be achieved as the same is discussed herein in connection with associating map grid data with tax data for a particular item of property.

As shown in the embodiment of FIG. 11, and as described further herein, the browse block can further includes instructions which are executable to email a friend 1122, express an interest rating 1124, and/or add an item (e.g., particular piece of property and/or associated party) to a watch list 1126. Further, as shown in the embodiment of FIG. 11, the browse block can include instructions which can execute to schedule a meeting between two parties (e.g., a buyer and seller) when a certain level of alignment exists between their respective indicators, as the same is described herein.

Figure 12:
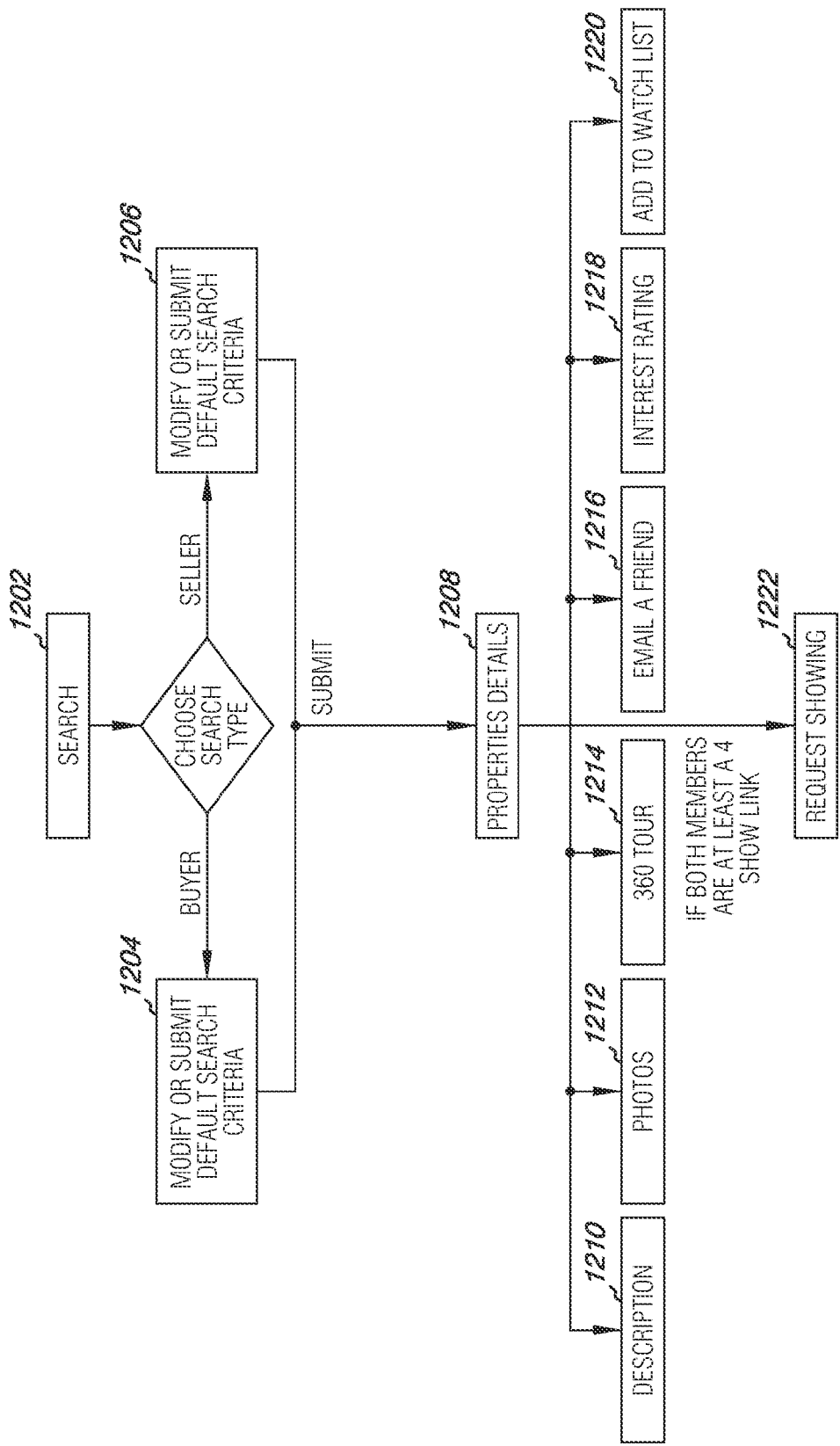
FIG. 12 is a block diagram representing in more detail an embodiment for the "search" block shown in FIG. 7.

FIG. 12 is a block diagram representing in more detail an embodiment for the "search" block 760 shown in FIG. 7. The search criteria choices will vary based on category of property being sold, for example, real property; residential, commercial, farms, lots and land or personal property such as farm equipment, cars, boats, etc. In the example embodiment of FIG. 12, the search diagram refers to real property. As such, the illustrated search criteria includes all available criteria currently available via most regional multiple listing services (MLSs). In the various system and property transaction device embodiments, however, none of the properties that are available via this system will be listed via an MLS. In the various embodiments, all of the properties that are searchable are other users' seller profiles as well as the capability to perform a buyer profile search from the buyer needs entered into the system.

The embodiment of FIG. 12 shows that from a search option 1202, a user can choose between a buyer block 1204 which includes instructions that can be executed to modify or submit default search criteria and a seller block 1206 which includes instructions that can be executed to modify or submit default search criteria. As shown in the embodiment of FIG. 12, these search criteria can be submitted to a properties details block, shown at 1208. As one of ordinary skill in the art will appreciate upon reading this disclosure, the properties details block includes instructions which can be executed to enter numerous property details, including description 1210, photos 1212, a 360 degree tour 1214, etc. The search diagram is similar to traditional web property browsing, except that in accordance with embodiments of the present invention, a user (e.g., potential buyer, seller, and/or agent) who is researching her/his competition may pinpoint her/his search down to a map section or neighborhood. One of ordinary skill in the art will appreciate the manner in which this can be achieved as the same is discussed herein in connection with associating map grid data with tax data for a particular item of property.

As shown in the embodiment of FIG. 12, and as described further herein, the search block can further includes instructions which are executable to email a friend 1216, express an interest rating 1218, and/or add an item (e.g., particular piece of property and/or associated party) to a watch list 1220. Further, as shown in the embodiment of FIG. 12, the browse block can include instructions which can execute to request a showing between two parties (e.g., a buyer and seller associated with a particular item of property) when a certain level of alignment exists between their respective indicators, as the same is described herein.

FIG. 13 is a block diagram representing in more detail an embodiment for the "watchlist" block 770 shown in FIG. 7. As one of ordinary skill in the art will appreciate upon reading this disclosure, the watchlist block embodiment 1302 of FIG. 13 illustrates a watch list of properties or buyers 1302 that a buyer/seller member would like to monitor for any changes in their respective indicator levels, e.g., ready, willing and able status indicators. As shown in the embodiment of FIG. 13, the watch list block can include a number of up/down down indicators, e.g., illustrated as fields 1304, 1310, 1316, reflecting movement in a respective indicator level, e.g., RWA rating status. One of ordinary skill in the art will appreciate upon reading this disclosure the manner in which instructions can be executed to operate on, e.g., analyze input data, and to output a displayable up/down indicator associated with a particular entity and/or particular item of property.

In the embodiment of FIG. 13, a "2nd Party RWA (ready, willing, and able) Self Indicator" is shown in a field 1306. As mentioned above as one example, the "2nd Party RWA Self Indicator" can include a ranking on a numerical scale (e.g., in a numerical range of 1-5 with 5 being the highest value) that the potential buyer or seller has given to herself/himself. In the embodiment of FIG. 13, a "1st Party ranking of 2nd Party's property or buyer profile" is shown in a field 1312. By way of example and not by way of limitation, program embodiments can execute instructions to allow a buyer or seller to rank properties or buyers against each-other, e.g., with a number ranking from 1-100. Embodiments, however, are not limited to these examples and/or a particular numerical range. In various embodiments, as a buyer or seller ranks another buyer or seller, that buyer or seller will have access to their ranking as a means to encourage buyers and sellers to fully complete their buyer and seller profiles so they receive a higher ranking and overall higher aggregate ranking.

As one of ordinary skill in the art will appreciate upon reading this disclosure, by allowing a buyer or seller to rank properties or buyers against each-other within a limited number ranking range, e.g., limited to 100, the system and property transaction device embodiments will encourage the "ranker" to choose which buyers and sellers make it into the top 100 and which ones don't.

For example, if a seller is in a user's Watch list and changes her/his RWA status from a 5-2 (e.g., in a numerical range of 1-5 with 5 being the highest value), that particular seller may see their aggregate rating drop. As one of ordinary skill in the art will appreciate upon reading this disclosure, program embodiments can execute instructions such that once a user ranks another, the ranked user is requested to rank the user who just ranked them.

In the embodiment of FIG. 13, another type of "1st party rating of 2nd party's property or buyer profile" is shown in a field 1318. In various embodiments this other type of rating can include a standalone rating which may include a "not interested" rating which can serve an indicator to the system to never show the buyer or seller profile again.

In the embodiment of FIG. 13, a "Picture" field is shown in a field 1320. As one of ordinary skill in the art will appreciate this picture field 1320 can include a thumb nail picture or other a visual reminder of the property in question. Program embodiments can execute instructions to restrict various pictures according to various selectable configurations, e.g., the system and property transaction device embodiments can be configured such that there are no pictures of buyers.

In the embodiment of FIG. 13, a "Map Page and Section" field is shown in a field 1322. In various embodiments, the "Map Page and Section" applies to the sale of real property only and is an indicator of the map page and section (e.g., as the same is described herein in association with map grid data) that the seller's property is located. As one of ordinary skill in the art will appreciate upon reading this disclosure, there are no map page and section coordinates for buyers.

Further in the example embodiment of FIG. 13, "Price, Bed, Bath and Garage" field are shown as field 1324, 1326, 1328, and 1330. As one of ordinary skill in the art will appreciate upon reading this disclosure, the "Price, Bed, Bath and Garage" fields are just a sample of possible data elements on a watch list. Embodiments, however, are not limited to these examples.

Also shown in the example embodiment of FIG. 13 is a "Setup a Showing" field shown as field 1332. As one of ordinary skill in the art will appreciate upon reading this disclosure, program embodiments can execute instructions such that if the buyer or seller is less than a 4 (e.g., continuing to use numerical range example of 1-5 with 5 being the highest value), this option field will be grayed out and be inactive with a prompt that the user would have to increase their associated indicator level, e.g., RWA rating status, in order to request a showing.

Figure 14:
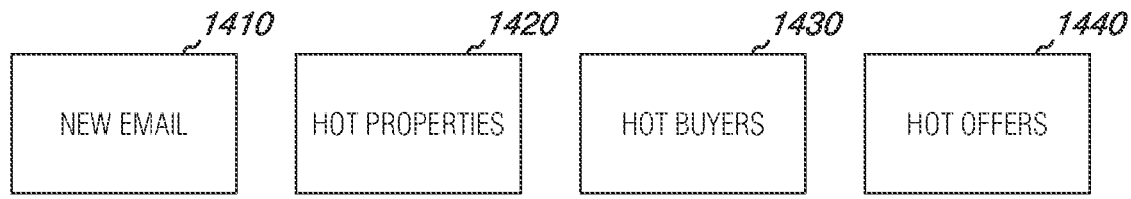
FIG. 14 is a block diagram representing in more detail an embodiment for the "buyer/seller toolbar" block shown in FIG. 7.

FIG. 14 is a block diagram representing in more detail an embodiment for the "buyer/seller toolbar" block 780 shown in FIG. 7. As one of ordinary skill in the art will appreciate upon reading this disclosure, a "toolbar" is an example of an application which may provide immediate notifications to a user regarding generated device/system events. The program embodiments described herein can be implemented on other platforms and networks, e.g., cell phone, voice or text messages, task bar applications, etc., to attain the same results. As shown in the embodiment of FIG. 14, one example for the "buyer/seller toolbar" block can include a link to new email, as shown at 1410, a link to hot properties, as shown at 1420, a link to hot buyers, as shown at 1430, and a link to hot offers, as shown at 1440. Embodiments, however, are not limited to these examples. As one of ordinary skill in the art will appreciate upon reading this disclosure, program embodiments associated with these links, e.g., 1410, 1420, 1430, and 1440, can be executed as indicators that certain system events have occurred. For example, in various embodiments, the indicators start at 0 and are incremented by 1 as a system event is generated that the buyer or seller should be made aware of.

By way of example and not by way of limitation, the new email link 1410 can be for internal email only, e.g., email on a closed system. In the case of agent assisted real property transactions, all email is received and sent to one agent only from a prospect. So for a given buyer or seller the link will only have system generated email in the mailbox along with email from one particular Realtor. In an unfacilitated environment, e.g., outside of the system and property transaction device embodiments described herein, buyers and sellers may interact with each other freely.

Further, by way of example and not by way of limitation, the Hot Properties link 1420 can be for properties that are within the seller profile criteria of the user and having a specific associated indicator level, e.g., RWA rating. The Hot Buyers link 1430 can be for buyers whose buyer needs match the user's seller profile description of a property. And, the Hot Offers link 1440 can be for offers, discounts and coupons that specifically match the settings in offer selector, as the same has been described above.

Figure 15:
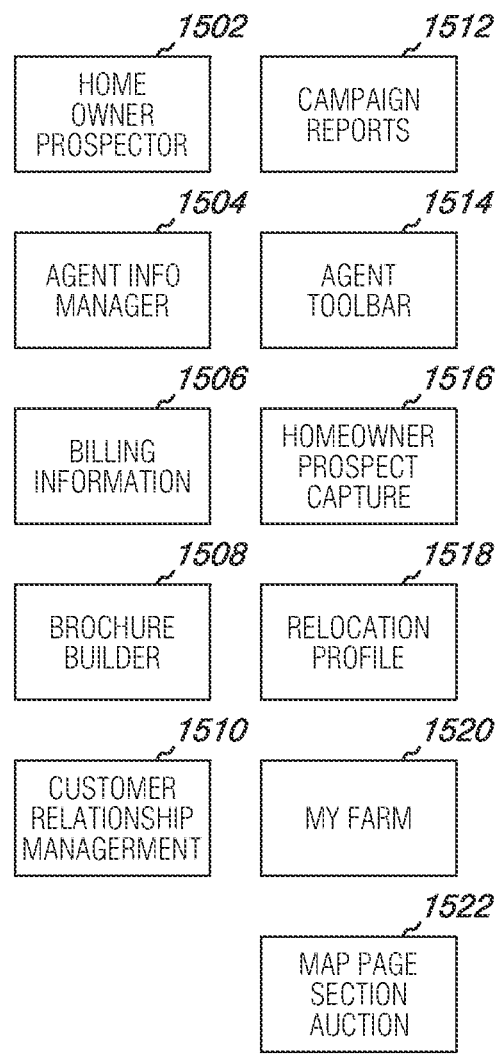
FIG. 15 is a block diagram representing in more detail an embodiment for the "my account agent" block shown in FIG. 6.

FIG. 15 is a block diagram representing in more detail an embodiment for the "my account agent" block 614 shown in FIG. 6. As shown in the embodiment of FIG. 15, these are examples of options that a real estate agent can see in the case of system network embodiments involving real property buyers and sellers. Embodiments, however, are not limited to this example.

In the example embodiment provided by FIG. 15, an Agent Info Manager link 1504 is illustrated. Program embodiments associated with the Agent Info Manager link 1504 can execute instructions to maintain a given agent user's membership information. Also shown in FIG. 15 is a Billing Information link 1506. Program embodiments associated with this link 1506 can execute in connection with the agent's credit card for billing of monthly membership fee and other marketing fees. The illustrated Brochure Builder link 1508 can be associated with program instructions which can execute as an application that allows agents to use templates to print brochures and have them printed with a local printing partner for agent pickup or direct mail. The illustrated Campaign Reports link 1512 can be associated with program instructions which can execute to generate reports for email campaigns which show how many emails were sent out, when, advertisers, percentage of fully advertised emails, how many emails opened, how many ads opened, coupons printed, etc.

In the example embodiment provided by FIG. 15, a Relocation Profile link 1518 is illustrated. Program embodiments can be executed in association with this link 1518 such that stand alone buyer profile input may be provided by an agent. Program embodiments associated with this link 1518 can execute instructions to include map sections or neighborhoods of interest. By way of example and not by way of limitation, this link 1518 can facilitate the submission of the profile which will trigger relocation alerts with matching seller profiles if the seller has chosen to receive relocation alerts, as the same has been described herein. The Home Owner Prospector link 1502, the Customer Relationship Management link 1510, the Agent Toolbar link 1514, the Homeowner Prospect Capture link 1516, the My Farm link 1520, and the Map Page Section Auction link 1522, can similarly have executable program embodiments associated therewith for added particular functionality. Aspects of such added functionality for these embodiments will be describes in the Figures to follow.

Figure 16:
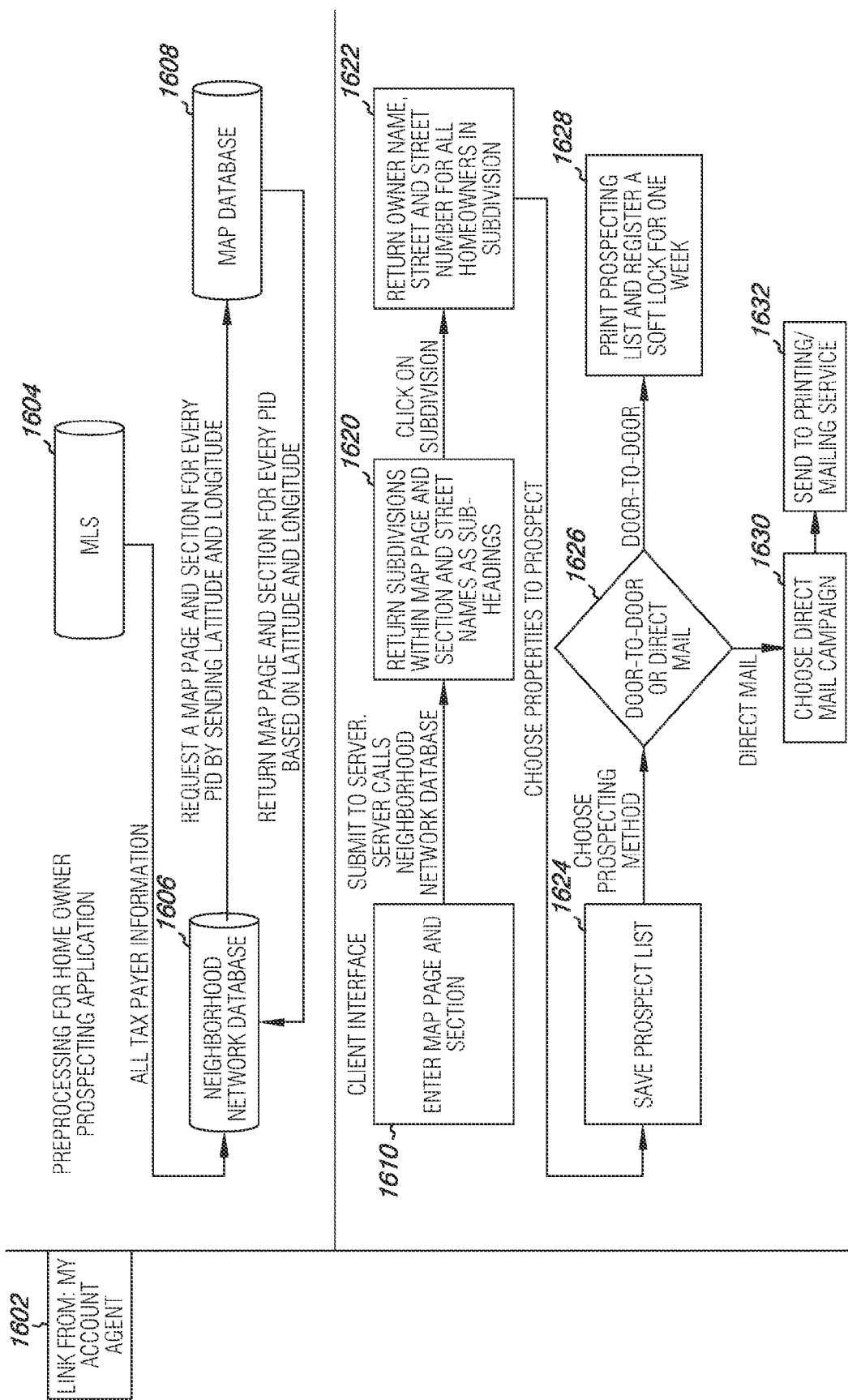
FIG. 16 is a block diagram representing in more detail an embodiment for the "home owner prospector" block shown in FIG. 15.

FIG. 16 is a block diagram representing in more detail an embodiment for the "home owner prospector" block 1502 shown in FIG. 15. As shown in more detail here in FIG. 16, the home owner prospector link 1602 can have executable program embodiments associated therewith to provide functionality for the creation of a network of buyers and sellers of real property. As shown in the example embodiment of FIG. 16, program instructions can execute in association with using a multiple listing service (MLS) 1604, or individual counties. The program embodiments execute instructions to import all tax payer data into a database of the network system embodiments described herein. As shown in FIG. 16, program embodiments can further execute instructions in association with other map databases 1608, such as other servers or third party content providers as the same has been described in connection with FIGS. 1 and 2.

As one of ordinary skill in the art will appreciate upon reading this disclosure, the program embodiments can execute instructions to identify the official map book of the local MLS. In various embodiments, the map book company can upload all map data to a server accessible by the network system embodiments. Likewise, in various embodiments, a map book company, e.g., TPC, can upload identifying information for each parcel identifier (PID) to a server accessible by the network system embodiments holding the map data. Program embodiments can execute instructions in conjunction with the map company to associate appropriate coordinates, e.g., geographic coordinates of latitude and longitude, to identify which map section a property is in.

One of ordinary skill in the art will appreciate upon reading this disclosure various manners in which this can be achieved. For example, a PID, street address or latitude and longitude (lat/lon) can be sent in bulk or individually via a web service to the map data store. Program instructions can execute to perform a lookup on the given information and share these with the map company which can then determine the map page and section within which the PID lies. As shown in the embodiment of FIG. 16, the PID can be returned to the network system embodiments with the associated map page and section information. As one of ordinary skill in the art will appreciate, the end result is that any particular address can be associated with a map page and section.

As in the example of FIG. 16, program instructions can execute such that after an agent authenticates as a member and chooses "Home Owner Prospector" a page, e.g., client interface page 1610, will appear which will prompt the agent to input a map page and section. In various embodiments, upon submission, the application will return a list of subdivisions, as shown in block 1620, within that map page and section with a sub-list of street names below each subdivision. The agent can click on the subdivision that the agent would like to canvas or send direct mail to and the names of the homeowners, their addresses and a space for their email address will follow, as shown in block 1622.

As illustrated in block 1624 of this embodiment, the agent may choose to save the list. In various embodiments, upon saving the list program instructions can execute to place a soft hold, e.g., register a soft lock for a period of time, on the list which notifies any other agents who save the same list that the list has been saved within this period of time, e.g., past week, by another agent. Further, the agent may choose one or more prospecting methods, e.g., door to door or direct mail campaign as shown in block 1626. As shown in FIG. 16, the list may be printed, as shown at block 1628, and/or submitted for a direct mail campaign to a printing and mailing service, as shown in 1630 and 1632.

Figure 17:
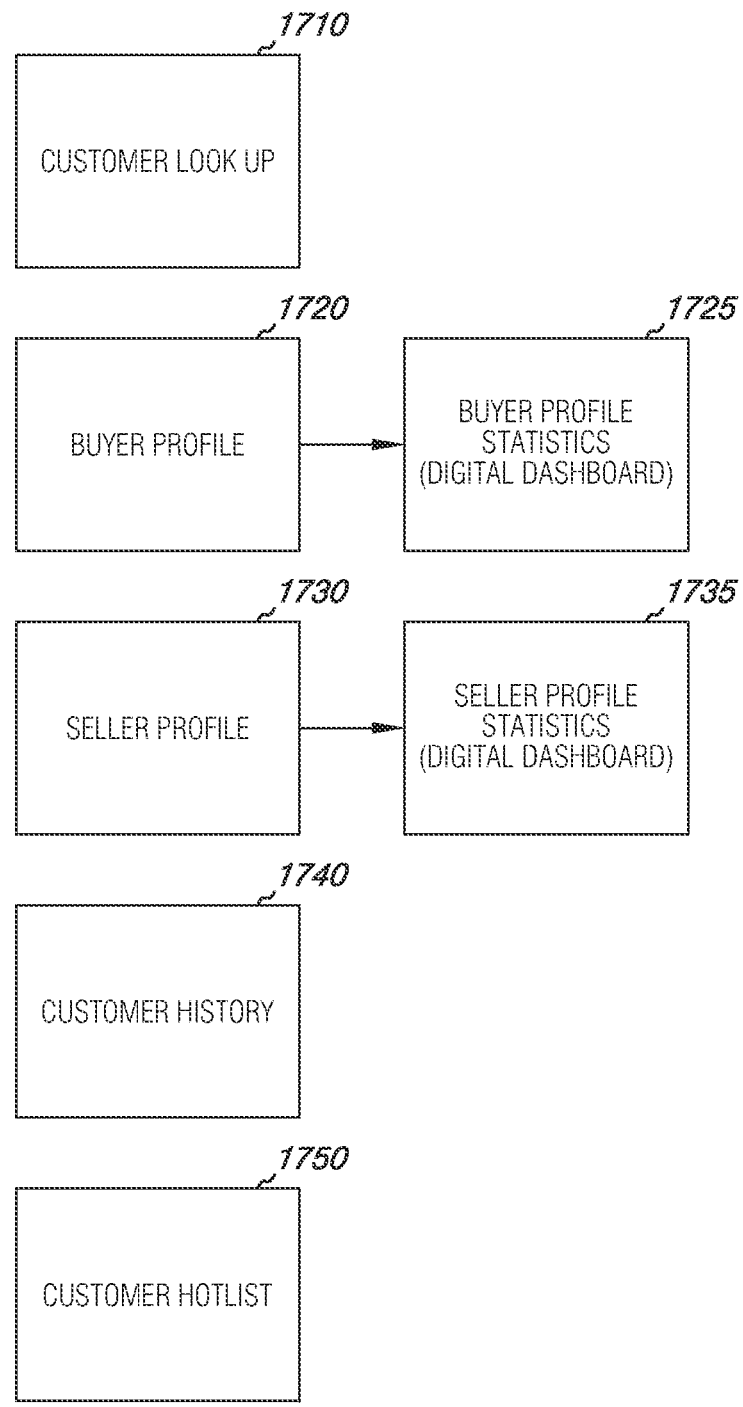
FIG. 17 is a block diagram representing in more detail an embodiment for the "customer relationship management" block shown in FIG. 15.

FIG. 17 is a block diagram representing in more detail an embodiment for the "customer relationship management" block 1510 shown in FIG. 15. As shown in more detail here in FIG. 17, the customer relationship management link 1510 can have executable program embodiments associated therewith to provide functionality and features used to track the evolution of the relationship between the customer and the agent over time.

In the example embodiment of FIG. 17 a Customer Lookup link 1710 is illustrated. Program embodiments can be executed in association with this link 1710 to allow multiple methods for an agent to lookup a customer's information, for example, by name, address, map section, email address, etc. As one of ordinary skill in the art will appreciate upon reading this disclosure, all agents can have direct access to their customer's buyer profiles, .e.g., shown as link 1720, seller profiles, e.g., shown as link 1730, and all of the statistics associated with each, e.g., number of matches by rating, rank, etc, shown as 1725 and 1735 respectively. Embodiments are not limited to these examples.

In the example embodiment of FIG. 17 a Customer History link 1740 is illustrated. In various embodiments, program instructions can be executed in association with this link 1740 to provide a complete history of communication with a particular prospect as well as an email trail. Further, in the example embodiment of FIG. 17, a Customer Hotlist 1750 is illustrated. And, in various embodiments, program instructions can be executed in association with this link 1750 to provide agents with access to all buyer and seller hot lists, as the same have been described herein.

Figures 18, 19:
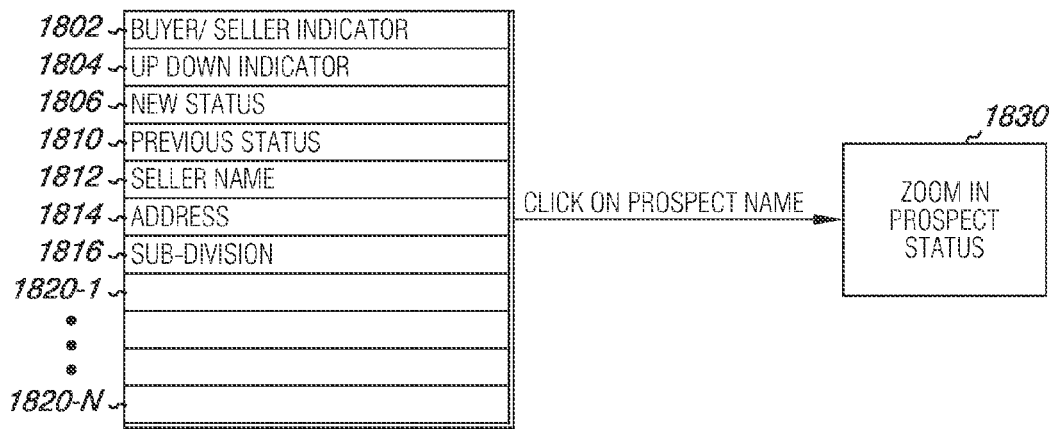
FIG. 18 is a block diagram representing in more detail an embodiment for the "buyer/seller prospect hotlist" block shown in FIG. 17.
FIG. 19 is a block diagram representing in more detail an embodiment for the "zoom in prospect status" block shown in FIG. 18.

FIG. 18 is a block diagram representing in more detail an embodiment for the "customer hotlist" block 1750 shown in FIG. 17. As shown in more detail here in FIG. 18, the customer hotlist link 1510 can have executable program embodiments associated therewith to provide functionality and features usable from within the agent's customer relationship management system. In the example embodiment of FIG. 18, the fields on the left can be provided as and represent columns of data. In the example embodiment of FIG. 18, the example fields are buyer/seller indicator 1802, up/down indicator 1804, new status 1806, previous status 1810, seller name 1812, address 1814, sub-division 1816, etc. Fields 1820-1, . . . , 1820-N represent that any number of fields may be chosen. Embodiments are not limited to these examples.

One of ordinary skill in the art will appreciate upon reading this disclosure that the agent's customers can be provided as and listed in rows. As shown in the embodiment at block 1830, program instructions can execute such that when the agent clicks on her/his customer's name the customer's information pops up listing their new RWA status, e.g., zoom in prospect status.

FIG. 19 is a block diagram representing in more detail an embodiment for the "zoom in prospect status" block 1830 shown in FIG. 18. As shown in more detail here in FIG. 19, the zoom in prospect status link can have executable program embodiments associated therewith to provide functionality and features such that for each customer an agent would be able to preview a number of top ranking buyer matches on the customers watch list (e.g., top 5 matches) and a number of top ranking new/unrated buyers (e.g., top 5 new/unrated buyers), e.g., top ranking buyer and seller statuses associated with a particular item of property as illustrated in fields 1902 and 1904 respectively.

Further, as shown in the embodiment of FIG. 19, the agent would be able to email either the buyers interested in the customer's property, e.g., as illustrated with link 1906, or the sellers whose property the customer is interested in, e.g., as illustrated by link 1908, or both. As one of ordinary skill in the art will appreciate upon reading this disclosure, this enablement in the network system and property transaction device embodiments described herein is designed as a way for the customer to click on the report and interact with their watch list.

Figure 20:
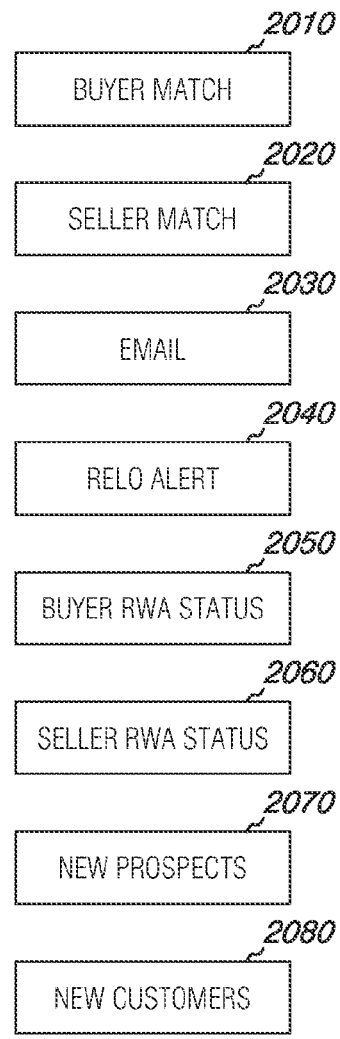
FIG. 20 is a block diagram representing in more detail an embodiment for the "agent toolbar" block shown in FIG. 15.

FIG. 20 is a block diagram representing in more detail an embodiment for the "agent toolbar" block 1514 shown in FIG. 15. As shown in the embodiment of FIG. 20, one example for the "agent toolbar" block can include a buyer match link as shown at 2010, a seller match link as shown at 2020, an email link as shown at 2030, a relocation alert link as shown at 2040, a buyer level indicator (e.g., buyer RWA status) link as shown at 2050, a seller level indicator (e.g., seller RWA status) link as shown at 2060, a new prospects link as shown at 2070, and a new customers link as shown at 2080. Embodiments, however, are not limited to these examples. As one of ordinary skill in the art will appreciate upon reading this disclosure, program embodiments associated with these links, e.g., 2010, 2020, 2030, 2040, 2050, 2060, 2070, and 2080, can be executed as indicators that certain system events have occurred.

By way of example and not by way of limitation, the embodiment of FIG. 20 depicts the text links within and agent specific Internet Explorer toolbar as the same will be known and understood by one of ordinary skill in the art. In various embodiments, an agent will be notified when a customer is at a particular indicator level status, (e.g., a 5, in a numerical range of 1-5 with 5 being the highest value) and a buyer or seller matches that customer's buyer or seller need (e.g., also has an indicator level status of a 5).

In the example embodiment provided by FIG. 20, program embodiments associated with the email link 2030 can execute instructions to provide a notification that a new system or customer correspondence is in the agent's internal web based email box. Program embodiments associated with the relocation alert link 2040 can execute instructions to indicate that there is a relocation buyer who is interested in a particular neighborhood.

As one of ordinary skill in the art will appreciate upon reading this disclosure, program instructions executing in connection with this feature provides a heads up that a customer who owns a house in that neighborhood may be calling or sending an email that they are interested in setting up a one time showing for the relocation customer. Further as program instructions execute in connection with this feature, when a separate agent submits that they have a relocation buyer or perhaps a first time home buyer the emails that go out to the homeowners in the neighborhood of interest will actually have a reply to an email address of the agent that originally signed them up or that they have subsequently chosen.

Program embodiments associated with the buyer RWA status link 2050 can execute instructions to notify an agent of a customer's upgrade of an RWA status according to the notification rules, e.g., as described herein in association with notice preferences. Likewise, program embodiments associated with the seller RWA status link 2060 can execute instructions to notify an agent of a customer's upgrade of an RWA status according to the notification rules.

In various embodiments, program instructions can execute in connection with the new prospects link 2070 to provide notifications of a house that has sold within a section within which the agent has prospects or if the agent has paid for the section, within the agent's exclusive section. Additionally, program instructions can execute in connection with the new customers link 2080 to identify customers who have just signed up or transferred from another agent to the logged in agent.

Figure 21:
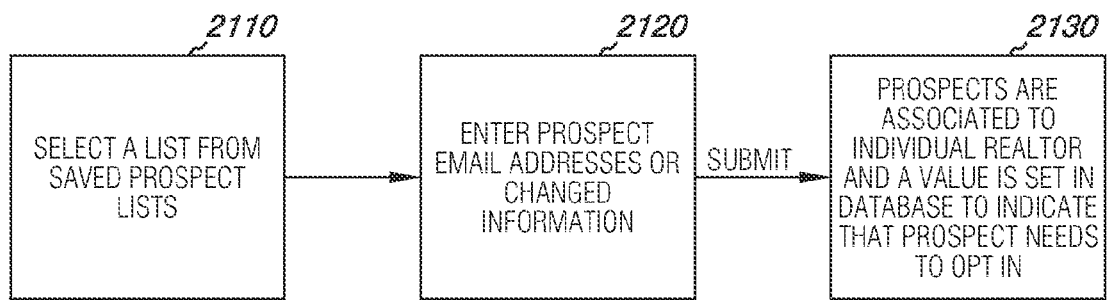
FIG. 21 is a block diagram representing in more detail an embodiment for the "home owner prospect capture" block shown in FIG. 15.

FIG. 21 is a block diagram representing in more detail an embodiment for the "home owner prospect capture" block 1516 shown in FIG. 15. As shown in the embodiment of FIG. 21, the "home owner prospect capture" block includes programs instructions which can execute in association with a number of displayable pages and/or links to allow an agent to perform additional home owner prospecting. For example, the agent would go to the home owner prospect capture pages after the agent is finished with collecting email addresses in order to capture the email addresses within the system.

In the example embodiment provided by FIG. 21, a list select link is illustrated at 2110. As one of ordinary skill in the art will appreciate upon reading this disclosure, an agent can execute program instructions in connection with this link to select a list from saved prospect lists. In the example embodiment provided by FIG. 21, program instructions can execute in connection with an edit link 2120 to enter captured addresses or update owner information with an email address. Thus, for example, at this point the agent may recall a saved prospecting list in order to enter captured addresses or update owner information with an email address.

Further, in the example embodiment provided by FIG. 21, an association link is illustrated at 2130. As one of ordinary skill in the art will appreciate upon reading this disclosure, an agent can execute program instructions in connection with this link such that a customer is associated with and individual agent to receive and deliver network based communications regarding hosting showings or setting up buyer showings for properties in which the customer is interested. Embodiments, however, are not limited to these examples.

Figure 22:
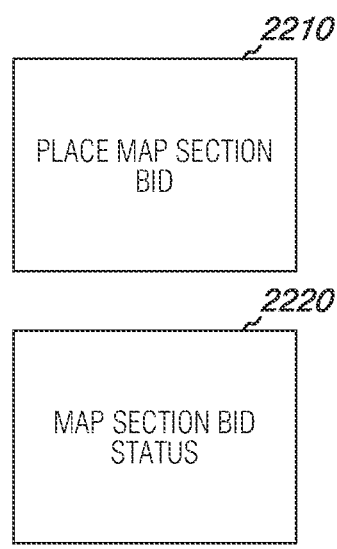
FIG. 22 is a block diagram representing in more detail an embodiment for the "map page section auction" block shown in FIG. 15.

FIG. 22 is a block diagram representing in more detail an embodiment for the "map page section auction" block 1522 shown in FIG. 15. According to various embodiments of the network system and property transaction device, agents will have an opportunity to bid on exclusive listings and/or representations in association with particular items of property.

In the case of real property, agents have the opportunity to bid on exclusive rights for all map sections for a particular region. For example, if an agent would like to increase their market share in a particular section or maintain their market share an agent can execute program instructions to place a map section bid using a link as illustrated at 2210. As further illustrated in this example, an agent can execute program instructions to check map section bid status using a link as illustrated at 2220.

One of ordinary skill in the art will appreciate upon reading this disclosure the manner in which such an auction can be implemented and conducted in the network system and property transaction device embodiments described herein. By way one example and not by way of limitation, upon placing the bid in an auction and successfully winning the agent in the case of real property would have exclusive rights to secure the email addresses of the property owners in that section for a specified period of time. In various embodiments, the auction process may take place in any form, e.g., silent auction, sealed bids, ascending or descending.

Embodiments as described herein enable items of property, e.g., a region of real property, to be divided up by sections of map grid data and enable assigning and recording exclusive rights to particular agents to market to the property owners. In various embodiments, a stipulation may also be made within the system such that if an agent with exclusive rights to secure a property owner's email address within the system has secured the address, and, following the successful capture of the email address, the property owner decides to choose another member agent within the system or invite an agent to join, then the agent who captured the email address may be entitled to a commission. Embodiments, however, are not limited to these examples.

Figure 23:
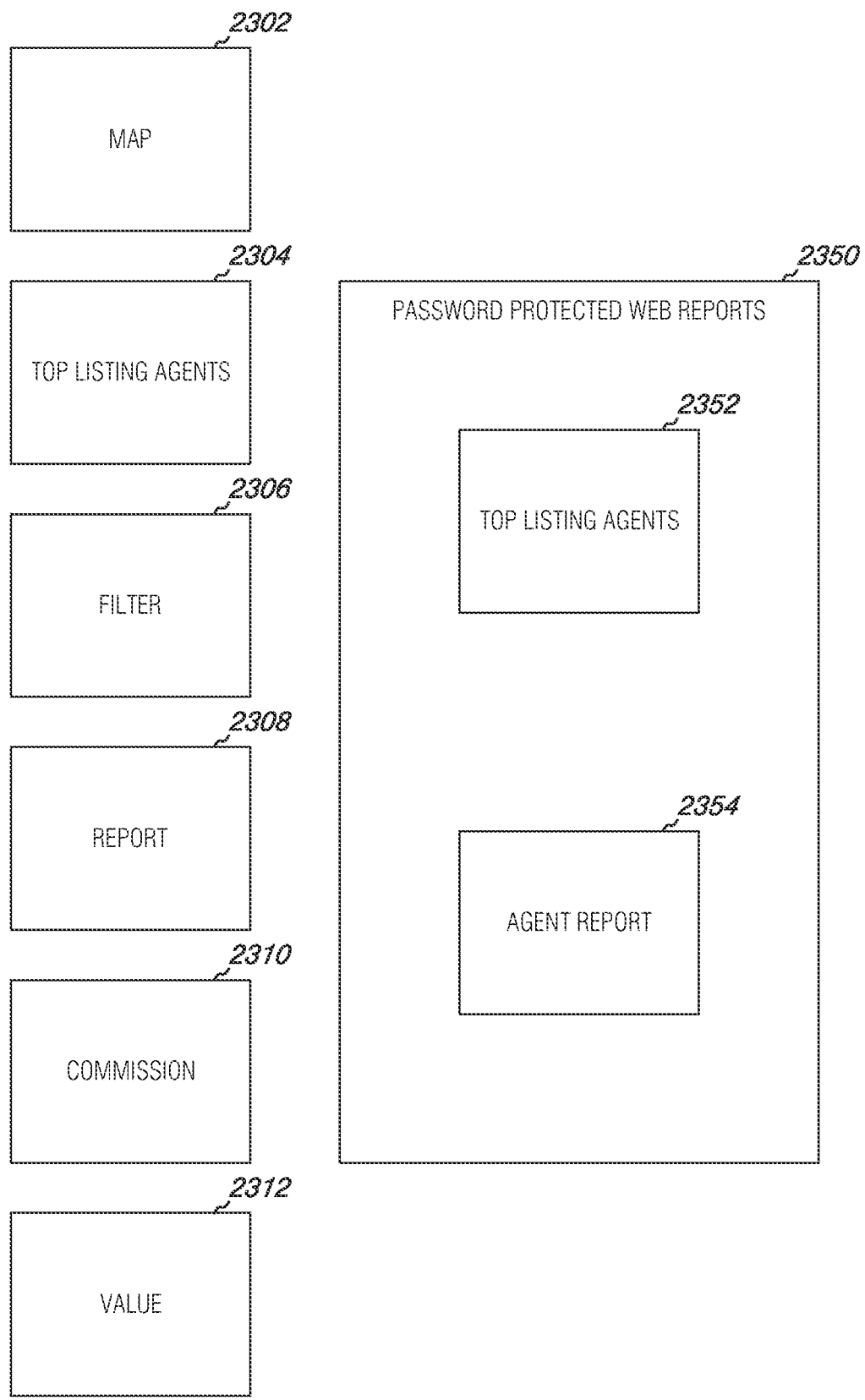
FIG. 23 is a block diagram representing in more detail an embodiment for the "my farm" block shown in FIG. 15 illustrating detail for map section value and market share.

FIG. 23 is a block diagram representing in more detail an embodiment for the "my farm" block 1520 shown in FIG. 15 illustrating detail for map section value and market share. As shown in the embodiment of FIG. 23, one example for the "my farm" block can include a map link as shown at 2302, a top agent link as shown at 2304, a filter module as shown at 2306, an agent report module as shown at 2308, and a commission module as shown at 2310. There can further be included program embodiments which execute instructions to provide access to performance based links as illustrated at 2350. Embodiments, however, are not limited to these examples. As one of ordinary skill in the art will appreciate upon reading this disclosure, program embodiments associated with these links and/or modules, e.g., 2302, 2304, 2306, 2308, 2310, 2312, and 2350, can be executed as indicators that certain system events have occurred.

As one example, the embodiment of FIG. 23 is discussed in connection with real property. Embodiments, however, are not limited to this example. In the case of real property transactions the map link 2302 can include a regional map of real property data, e.g., the regional map can include an "official" map used by any regional multiple listing service (MLS). For example, in the Twin Cities (Minneapolis/St. Paul, Minn.) market, the locally known "King's Map" could be provide via program instructions executing in connection with the map link 2302. To use this example at the time of this disclosure, the map link 2302 would then include 229 pages, 20 sections pages, and 4580 pages, for instance.

The follow this example, the top agent link as shown at 2304 can include executable instructions associated with program embodiments to display the top three listing agents sorted by map page and section, by volume, and then total sales dollars. Embodiments, however, are limited to these examples. One of ordinary skill in the art will appreciate upon reading this disclosure the manner in which program embodiments described herein can execute instructions to extract any selectable number of top listing agents and to sort the same according to various selectable categories. In various embodiments, either in a printable fashion or via a computer application, program instructions can execute to extract the top listing agents who closed sales, e.g., the top 3 agents, within any section within the past year by volume or transaction dollars, etc.

In various embodiments, a filter module as illustrated at 2306 is provided. One of ordinary skill in the art will appreciate upon reading this disclosure the manner in which program instructions can execute as part of a filter module to filter out all agents not meeting a selectable criteria. To follow in the above example, all agents not within the top number, e.g., 3 for this example, will be filtered out.

In various embodiments, a report module as illustrated at 2308 is provided. One of ordinary skill in the art will appreciate upon reading this disclosure the manner in which program instructions can execute as part of a report module to report agents within the selectable top number. To follow in the above example, top producing agents per section may be available by print or via a computer application.

In various embodiments, a commission module as illustrated at 2310 is provided. One of ordinary skill in the art will appreciate upon reading this disclosure the manner in which program instructions can execute as part of a commission module to provide displayable commission data based on a number of selectable criteria. For example, program instructions can executes as part of a commission module to section wide list side commissions, e.g., based on a three percent (3%) commission.

In various embodiments, a value module as illustrated at 2310 is provided. One of ordinary skill in the art will appreciate upon reading this disclosure the manner in which program instructions can execute as part of a value module to provide displayable value data based on a number of selectable criteria. For example, program instructions can execute as part of a commission module to provide base value of a section determined as a percentage of the average list side commission.

Again, one of ordinary skill in the art will appreciate upon reading this disclosure that the embodiments are not limited to real property applications and/or to the examples given herein. One of ordinary skill in the art will further appreciate upon reading this disclosure that the performance based links illustrated at 2350 can provide additional levels of access and user rights to users, e.g., agents falling within selectably defined classes. For example, qualifying agents will have the ability to view their most productive sections by volume and transaction dollars as illustrated at 2352. In various embodiments, based on the data available to the agent, the agent will have the opportunity to place a bid via an auction for the exclusive right to market to a specific region as illustrated at 2354. In various embodiments, the rights can be selectably configured by the execution of program instructions to only extend to recording property owners email addresses within this system.

Figure 24:
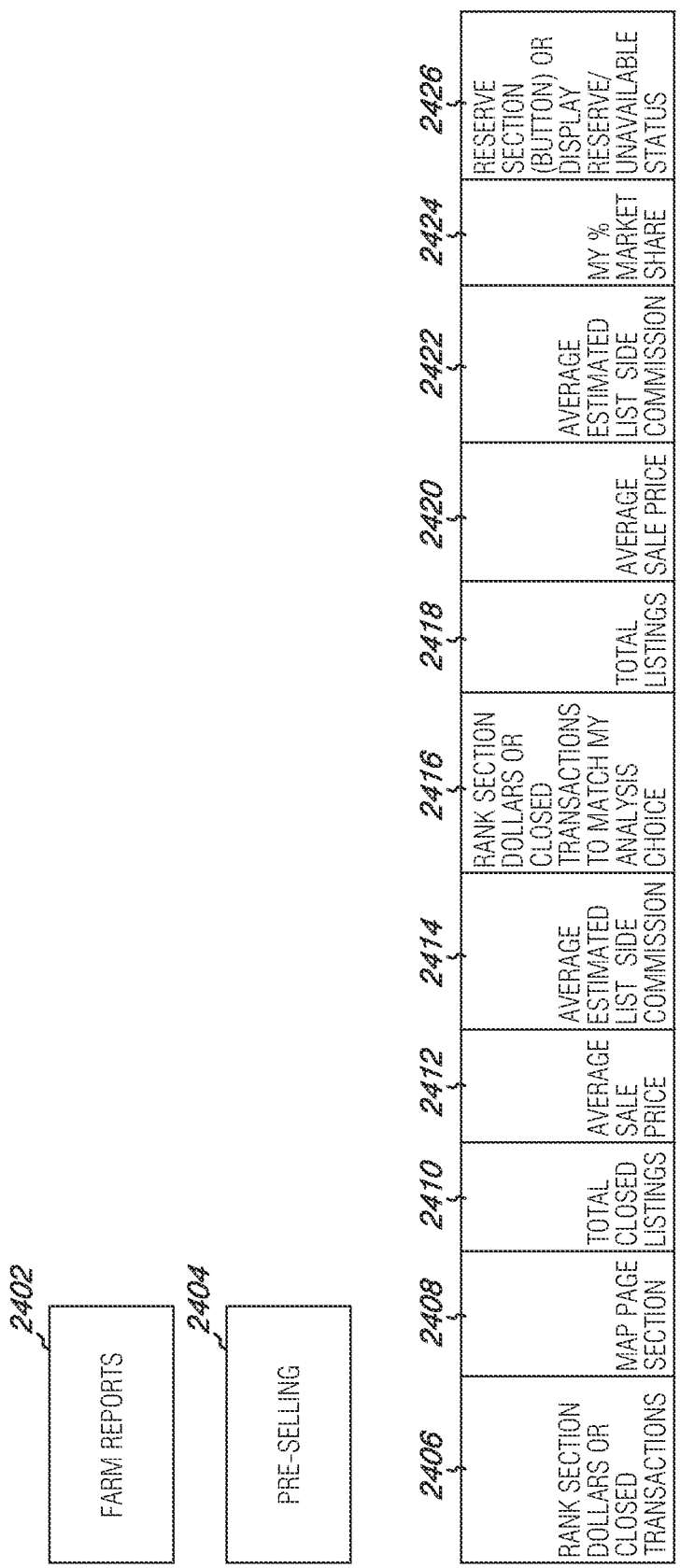
FIG. 24 is a block diagram representing in more detail an embodiment for the "my farm" block shown in FIG. 15 illustrating detail for market share analysis per map page section.

FIG. 24 is another block diagram representing in more detail an embodiment for the "my farm" block 1520 shown in FIG. 15 illustrating detail for market share analysis per map page section. As one of ordinary skill in the art will appreciate upon reading this disclosure, the my farm block embodiment of FIG. 24 can include program instructions that execute in association with a farm reports link 2402 and/or a pre-selling link 2404, as just one example. Together with these example links, program instructions can execute to selectively display a number of fields, illustrated in the example embodiment of FIG. 24 as 2406, 2408, 2410, 2412, 2414, 2416, 2418, 2420, 2422, 2424, and 2426. The example embodiment illustrated in connection with FIG. 24 demonstrates that program embodiment can executes instructions in association with various features and functionality to provide displayable reports.

For example, the displayable report embodiment of FIG. 24 illustrates a report that can enable agents to view the value of a section to a particular agent by total volume or transaction dollars for a map page and section, e.g., fields 2406 and 2408. Also illustrated are fields showing total closed listings as 2410, and average sales price 2412. In the embodiment of FIG. 24, program embodiments can execute instructions to rank section dollars or closed transactions to match a user's analysis choice as shown in field 2416. As shown in the embodiment of FIG. 24, fields can additionally be provided illustrating total listings 2418 and average sales price 2420. As illustrated in field 2422, the list side commission estimate is displayable and, by execution of program instructions is adjustable and can be different by region.

As one of ordinary skill in the art will appreciate upon reading this disclosure, within the same row, an agent may view how they compare to total listings per section in the last year as well as average sale price, average estimated list side commission. In the embodiment of FIG. 24, a field 2424 is illustrated, by execution of program instructions, to allow the individual agent to compare their market share in a given section to the rest of the market. Further, as illustrated by the embodiment of FIG. 24, program embodiments can execute instructions to allow agents to reserve a section associated with map data and/or bid on a section via an auction, as illustrated in field 2426 and as the same has been described herein. Embodiments, however, are not limited to the examples provided in FIG. 24. Thus, as stated in a previous Figures discussion, program embodiments can execute instructions to divide up into sections, assign (sell), and track information on regions associated with map data and particular member agents.

Figure 25:
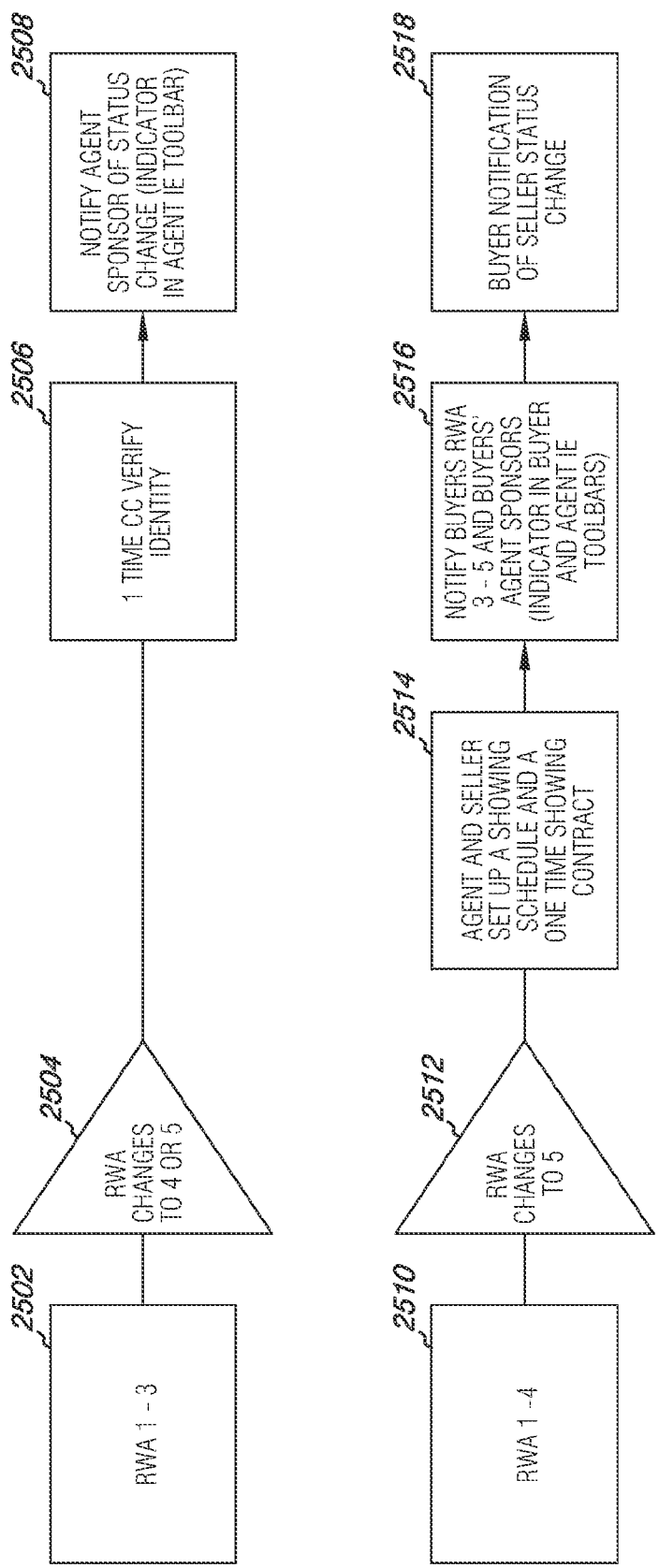
FIG. 25 is a block diagram representing an embodiment for an indicator associated with a seller of property, represented in this example as a number of ready, willing, and able indicator levels.

FIG. 25 is a block diagram representing an embodiment for establishing an indicator level associated with a seller of property. For example, from a seller profile link, as the same has been described herein, program embodiments can be executed based on user input to establish an indicator level associated with a seller and/or seller's property. In the embodiment of FIG. 25, a seller indicator level is represented as numerical indicator (e.g., in a numerical range from 1 to 5 with 5 being the most proactive) and expressed here as ready, willing, and able (RWA) indicator. As described above, the ready, willing, and able factors are associated with an individual's state of mind as influenced by various life circumstances as the same have been described above. As described herein, a given RWA numerical indicator level ratings can be subjective to the user, but according to the execution of program instructions can be determined in association with definable general rating guidelines and definable business rules described in the network system embodiments and property transaction device embodiments discussed.

Thus, by way of example and not by way of limitation, the embodiment of FIG. 25 illustrates a flow chart documenting a property owner's transition from an indicator level expression in the numerical range of 1-3 to a 4 or 5. As has been described herein, a change from one indicator level expression to another may be controlled by program instruction execution according to defined business rules. To illustrate, in block 2502 a seller may change, e.g., adjust up and/or down, their numerical indicator level within a numerical range from 1-3 in an unrestricted manner.

At block 2504, a seller user attempts, e.g., requests based on input, to change their numerical indicator level to a 4 or 5. In this example embodiment, e.g., associated with real property, at block 2506 program instructions will execute, based on user input, to verify user identity. For example, the program embodiments can execute to request a credit card number or other financial account number to verify and authenticate the user's identity. As one of ordinary skill in the art will appreciate upon reading this disclosure, such verification can be used to confirm the item of property associated with the seller is the seller's principle residence, etc. In other words, once a property owner changes their rating from a 1-3 to a 4 or 5, program instructions can execute to verify the item of property, verified as owned by a particular user, is the property owner's principle residence. One of ordinary skill in the art will further appreciate upon reading this disclosure that the program embodiments can execute instructions to verify such information by performing a match up of a particular property address with the billing address of the credit card provided by the user.

Further, as illustrated in block 2508, program embodiments can execute instructions such that an agent may be notified via the agent's toolbar, as the same has been described herein, of the status change. In various embodiments, program instructions are executed such that when a seller having an RWA indicator from 1-4 (e.g., block 2510) changes their ready willing and able rating of a 1-4 to a 5 (e.g., block 2512), and for example signs a showing agreement, the agent and seller can coordinate a showing schedule and/or a one time showing contract as shown in block 2514. As shown in blocks 2516 and 2518, program embodiments can further execute such that buyers, and/or agent sponsors, will be notified who have expressed interest in the property and have a buyer RWA rating of at least a 3-5.

As one of ordinary skill in the art will appreciate upon reading this disclosure, such a set of restrictions is one example of the definable business rules which can be implemented by execution of the program embodiments described herein. Embodiments, however, are not limited to these examples.

Figure 26:
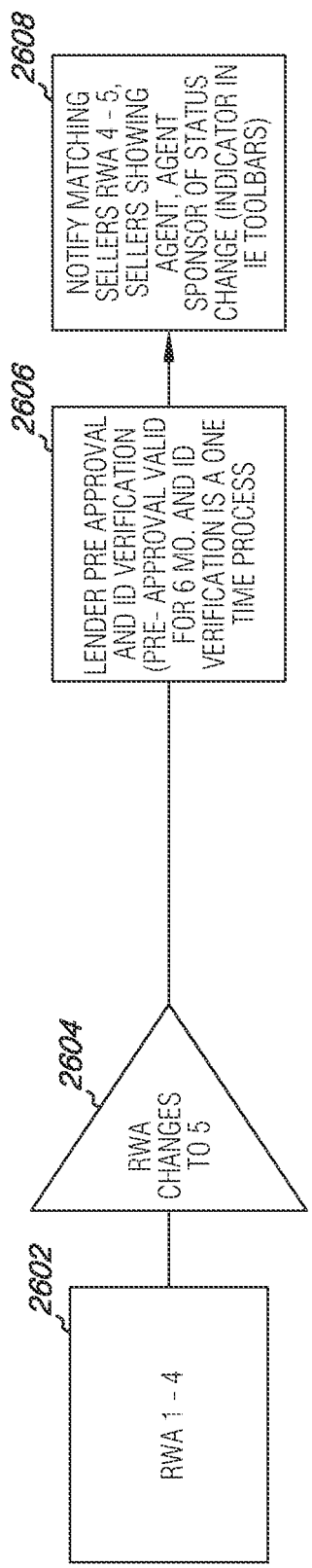
FIG. 26 is a block diagram representing an embodiment for an indicator associated with a buyer of property, represented in this example as a number of ready, willing, and able indicator levels.

FIG. 26 is a block diagram representing an embodiment for establishing an indicator level associated with a buyer of property. For example, from a buyer profile link, as the same has been described herein, program embodiments can be executed based on user input to establish an indicator level associated with a buyer's interest in a particular item of property. In the embodiment of FIG. 26, a buyer indicator level is again represented as numerical indicator (e.g., in a numerical range from 1 to 5 with 5 being the most proactive) and expressed here as ready, willing, and able (RWA) indicator. As described above, the ready, willing, and able factors are associated with an individual's state of mind as influenced by various life circumstances as the same have been described above. And, as described above, a given RWA numerical indicator level ratings can be subjective to the user, but according to the execution of program instructions can be determined in association with definable general rating guidelines and definable business rules described in the network system embodiments and property transaction device embodiments discussed.

Thus, by way of example and not by way of limitation, the embodiment of FIG. 26 illustrates a flow chart documenting a buyer's transition from an indicator level expression in the numerical range of 1-4 to a 5. As has been described herein, a change from one indicator level expression to another may be controlled by program instruction execution according to defined business rules. To illustrate, in block 2602 a buyer may change, e.g., adjust up and/or down, their numerical indicator level within a numerical range from 1-4 in an unrestricted manner.

At block 2604, a buyer user attempts, e.g., requests based on input, to change their numerical indicator level to a 5. In this example embodiment, e.g., associated with real property, at block 2606 program instructions will execute, based on user input, to verify user identity. For example, the program embodiments can execute to request a credit card number or other financial account number to verify and authenticate the user's identity. Additionally, however, as shown in the embodiment of FIG. 26, the program embodiments can execute instructions to prompt the user to choose a lender, e.g., to select a lender associated with the system network embodiments and property transaction device embodiments described herein, in order to be pre-approved for a specific loan amount.

As illustrated in the embodiment of FIG. 26, the pre-approval may be recorded as valid for a particular time period, e.g., 6 months, and the verification may be conducted and recorded as a one time process. Thus, when a buyer changes her or his RWA rating from any number to a 5 the buyer will be prompted to choose a lender within the network in order to be pre-approved for a specific loan amount. In various embodiments, once a network member lender has indicated pre-approval and the amount of the pre-approval, program instructions can execute such that the buyer's RWA rating will automatically be come a 5 adjustable down by the buyer at any time and back to a 5 within a period of time to be preadjusted by an administrator. In this manner, the buyer will be preapproved to buy property up to a certain dollar amount.

Further, as illustrated in block 2608, program embodiments can execute instructions such that an agent may be notified via the agent's toolbar, as the same has been described herein, of the status change. In various embodiments, program instructions are executed such that when a buyer having an RWA indicator from 1-4 (e.g., block 2602) changes their ready willing and able rating to a 5 matching sellers having an RWA of at least 4-5 will be notified.

As one of ordinary skill in the art will appreciate upon reading this disclosure, such a set of restrictions is one example of the definable business rules which can be implemented by execution of the program embodiments described herein. Program embodiments can execute instructions in association with the above example to coordinate a showing once the defined business rules have been satisfied. The reader will appreciate that embodiments are not limited to these examples.

Figure 27:
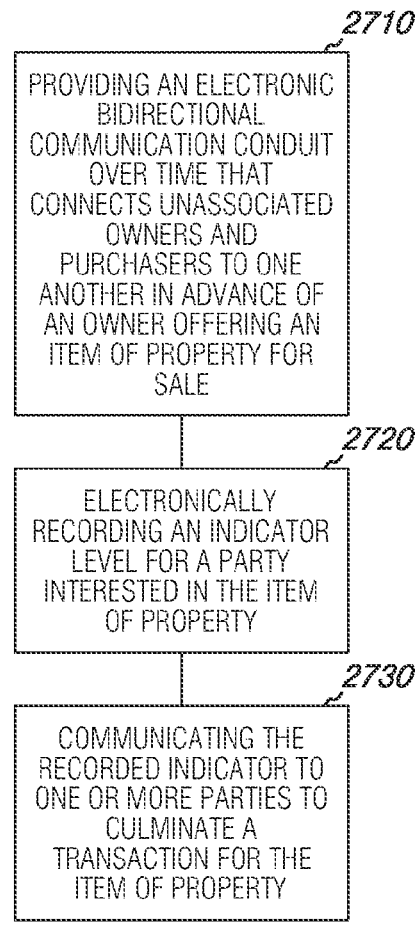
FIG. 27 is an illustration of a method embodiment.
Figure 28:
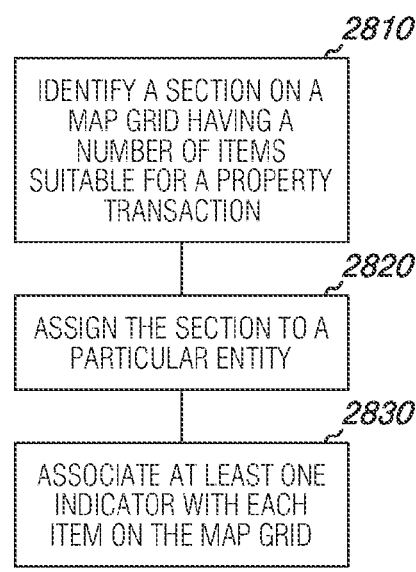
FIG. 28 is an illustration of another method embodiment.

FIGS. 27 and 28 illustrate various method embodiments for property transactions. As one of ordinary skill in the art will understand, the embodiments can be performed by software/firmware (e.g., computer executable instructions) operable on the devices shown herein or otherwise. The embodiments of the invention, however, are not limited to any particular operating environment or to software written in a particular programming language. Software, application modules, and/or computer executable instructions, suitable for carrying out embodiments of the present invention, can be resident in one or more devices or locations or in several locations.

Unless explicitly stated, the method embodiments described herein are not constrained to a particular order or sequence. Additionally, some of the described method embodiments or elements thereof can occur or be performed at the same point in time.

FIG. 27 illustrates one method embodiment for a property transaction. As shown in the embodiment of FIG. 27 the method includes providing an electronic bidirectional communication conduit over time that connects unassociated owners and purchasers to one another in advance of an owner offering an item of property for sale, at block 2710. Providing an electronic bidirectional communication conduit over time that connects unassociated owners and purchasers includes any of the devices, network systems, and techniques, as the same have been described above.

At block 2720, the method includes electronically recording an indicator level for a party interested in the item of property. Electronically recording an indicator level for a party interested in the item of property includes any of the devices, network systems, and techniques, as the same have been described above. At block 2730, the method includes communicating the recorded indicator to one or more parties to culminate a transaction for the item of property. Communicating the recorded indicator to one or more parties to culminate a transaction includes various techniques, devices, and systems as the same have been described herein.

FIG. 28 illustrates another method embodiment for a property transaction. As shown in the embodiment of FIG. 28 the method includes identifying a section on a map grid having a number of items suitable for a transaction, at block 2810. Identifying a section on a map grid includes the methods and techniques described above and herein.

At block 2820, the method includes assigning the section to a particular entity. Assigning the section to a particular entity includes using any of the devices, network systems, and techniques, as the same have been described above. At block 2830, the method includes associating at least one indicator with each item on the map grid. As one of ordinary skill in the art will appreciate upon reading this disclosure, associating at least one indicator with each item on the map grid includes using any of the devices, network systems, and techniques, as the same have been described above.

Although specific embodiments have been illustrated and described herein, those of ordinary skill in the art will appreciate that an arrangement calculated to achieve the same techniques can be substituted for the specific embodiments shown. This disclosure is intended to cover adaptations or variations of various embodiments of the invention.

It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A device for coordinating transactions, comprising:
   a processor;
   a memory coupled to the processor;
   a user interface coupled to the memory and processor;
   program instructions storable in the memory and executable by the processor to:
      associate real property map grid data, having page and section identifiers with property data for real property within the real property map,
      record an assignment of a section associated with the map grid data to a listing agent,
      record at least one indicator, having a number of levels representing interest of at least two parties in a transaction involving real property in the section, and
      identify an alignment of the at least two parties for a real property in the section based on the at least one indicator,
      wherein the at least two parties are at least one of an owner of the real property in the section and one of a buyer of real property in the section, and the at least one indicator is at least one of a seller indicator for the owner of the real property or a buyer indicator for the buyer of real property in the section, and
      wherein the alignment is communicated by the device to the listing agent to be used to make at least an introduction of the at least two parties for the real property in the section.

2. The device of claim 1, wherein the program instructions can be executed by the processor to receive the seller indicator associated with the owner of real property in the section, wherein the seller indicator is adjustable between a number of levels selected from the group of:
   a will not sell level;
   a neutral level;
   a may sell level;
   a will sell level based on seller definable terms and conditions; and
   a will allow and schedule inspections, tours, previews and will consider all offers from buyers with a certain buyer indicator level status.

3. The device of claim 1, wherein the program instructions can be executed by the processor to receive the buyer indicator associated with the buyer for real property in the section, wherein the buyer indicator is adjustable between a number of levels selected from the group of:
   a will not buy level; a neutral level;
   a may buy level; a will buy level for a particular piece of real property in the section based on buyer definable terms and conditions; and
   a will inspect, tour or preview the particular piece of real property.

4. The device of claim 1, wherein the program instructions can be executed by the processor to allow a prospective buyer and a prospective seller enter a number of criteria associated with the real property along with recording an indicator.

5. The device of claim 1, wherein the program instructions can be executed by the processor to select a lender from within a network of lenders as a pre-requisite to allowing a buyer to adjust an indicator associated with a particular piece of real property from a certain designated level to another.

6. The device of claim 1, wherein the program instructions can be executed by the processor to provide three methods of matching buyers and sellers of real property in the section, the three methods including:

electronically browsing profiles of interest;
electronically searching based on definable criteria; and
electronically providing unsolicited communications.

7. The device of claim 6, wherein the program instructions can be executed by the processor to allow a party to place a prospective match on a watchlist, and to provide event notifications to the party based on activities such as indicator changes associated with the watchlist.

8. The device of claim 7, wherein the program instructions can be executed by the processor to allow a party to establish preferences associated with the watchlist.

9. The device of claim 1, wherein the program instructions can be executed by the processor to:
   electronically market a piece of real property, associated with map grid data assigned to a particular listing agent, over time; and
   capture a level of buyer interest in the piece of real property as buyer interest changes over time.

10. A non-transitory computer readable medium including a set of instructions executable to cause a device to perform a method, comprising:
   capturing customer relationship management (CRM) data for a plurality of real property listing agents;
   capturing real property map data;
   identify a section in captured real property map data, the identified section having a number of items of real property within the real property map;
   assign the section to a listing agent;
   associate at least one indicator representing interest of at least two parties in a transaction with each item of real property in the section, wherein the at least two parties are at least one of an owner on an item or real property in the section and one of a buyer of an item of real property in the section, wherein the at least one indicator is at least one of a seller indicator for the owner of the item of real property or a buyer indicator for the buyer of real property;
   identifying an alignment of the at least two parties for the item of real property in the section based on the at least one indicator;
   capturing marketing data associated with each item of real property; and
   communicating the alignment to at least one of the plurality of real property listing agents to be used to make at least an introduction of the at least two parties for the item of real property in the section.

11. The non-transitory medium of claim 10, wherein the instructions are executable to synchronize CRM data with a third party database.

12. The non-transitory medium of claim 10, wherein the instructions are executable to synchronize real property map data with a region multiple listing service (MLS).

13. The non-transitory medium of claim 10, wherein the instructions are executable to synchronize market data with a third party database.

14. The non-transitory medium of claim 10, wherein the instructions are executable to enable multiple parties on separate sides of interest relative to one or more items of property to be continuously gather non-public information relevant to engaging in a real estate transaction associated with a particular item of real property before an owner of the particular item of property advertises the particular item of property for sale.

15. The non-transitory medium of claim 14, wherein the instructions are executable to continuously cascade an effect of event data received in association with the one or more items of real property to multiple indicators associated with the multiple parties.

16. The non-transitory medium of claim 15, wherein the instructions are executable to:
   identify one or more items of property using a global positioning service (GPS) enabled device; and
   provide one or more affiliates access to the device over a network connection.

17. A computer implemented method for real property transaction, wherein the method includes using a computer processor to execute instructions to perform the steps, comprising:
   providing an electronic bidirectional communication conduit over time that connects unassociated owners and purchasers to one another in advance of an owner offering an item of real property for sale;
   electronically associating real property map grid data, having page and section identifiers with property data for real property within the real property map;
   electronically recording an indicator level for at least two parties interested in a transaction involving the item of real property;
   identifying an alignment of the at least two parties for the item of real property based on the at least one indicator,
   connecting at least one of the unassociated owners and purchasers of an item of real property to a listing agent, lender, and advertiser; and
   communicating the recorded indicator to one or more parties to culminate a transaction for the item of real property,
   wherein the at least two parties are at least one of an owner of real property and one of a buyer of real property, and the at least one indicator is at least one of a seller indicator for the owner of the real property or a buyer indicator for the buyer of the real property, and
   wherein the alignment is communicated via the electronic bidirectional communication conduit to make at least an introduction of the at least two parties for the item of real property.

18. The method of claim 17, wherein the method includes cataloging and marketing items of real property continuously over time, including before, at time of, and after a transaction occurrence.

19. The method of claim 17, wherein the method includes:
   enabling buyers and sellers of real property and services to express needs via a rated buyer and seller profile; and
   enabling users, including buyers and sellers to browse and search manually and systematically, an interest of another.

20. A computerized system for determining a likelihood of a seller of real property entering into a transaction for the real property, comprising:
   a computer;
   a database of prospective sellers;
   software adapted to execute on the computer that associates real property map grid data, having page and section identifiers with property data for the real property within the real property map;
   means for populating the database with a set of characteristics for each prospective seller;
   software adapted to execute on the computer that utilizes the database with the set of characteristics to produce at least one indicator value that indicates a likelihood of each prospective seller entering into a transaction with a buyer; and
   means for presenting information to a user based on the values that indicate the likelihood of prospective sellers entering into a transaction for the real property.

21. The system of claim 20 where the sellers are providers of services.

22. The system of claim 20 where information for the set of characteristics for a given prospective seller is entered into the database by the given prospective seller.

23. The system of claim 20 where information for the set of characteristics for each prospective seller is automatically collected by and entered into the database by the means for populating the database.

24. The system of claim 20 where the means for presenting displays the value for the likelihood of at least one prospective seller entering into a transaction on a map.

25. The system of claim 20 where one of the set of characteristics indicates a seller's self-reported willingness to sell.

26. A computerized system for determining a likelihood of a buyer entering into a transaction for real property, comprising:
- a computer;
- a database of prospective buyers;
- software adapted to execute on the computer that associates real property map grid data, having page and section identifiers with property data for the real property within the real property map;
- means for populating the database with a set of characteristics for each prospective buyer;
- software adapted to execute on the computer that utilizes the database with the set of characteristics to produce at least one indicator value that indicates a likelihood of each potential buyer entering into a transaction with a seller of the real property; and
- means for presenting information to a user based on the values that indicate the likelihood of potential buyer's entering into a transaction for the real property.

27. The system of claim 26 where the buyers are buyers of services.

28. The system of claim 26 where information for the set of characteristics for a given potential buyer is entered into the database by the given potential buyer.

29. The system of claim 26 where the means for presenting displays the value for the likelihood of at least one potential buyer entering into a transaction on a map.

30. The system of claim 26 where one of the set of characteristics indicates the buyer's self-reported ability to buy.

* * * * *